United States Patent
Lanning et al.

(10) Patent No.: US 10,998,552 B2
(45) Date of Patent: May 4, 2021

(54) LITHIUM ION BATTERY AND BATTERY MATERIALS

(71) Applicant: Lyten, Inc., Sunnyvale, CA (US)

(72) Inventors: Bruce Lanning, Littleton, CO (US); Michael W. Stowell, Sunnyvale, CA (US); Bryce H. Anzelmo, Mountain View, CA (US); George Clayton Gibbs, Santa Clara, CA (US); Shreeyukta Singh, San Jose, CA (US); Hossein-Ali Ghezelbash, Santa Clara, CA (US); Prashanth Jampani Hanumantha, Mountain View, CA (US); Daniel Cook, Woodside, CA (US); David Tanner, Yuba City, CA (US)

(73) Assignee: LytEn, Inc., San Jose, CA (US)

( * ) Notice: Subject to any disclaimer, the term of this patent is extended or adjusted under 35 U.S.C. 154(b) by 0 days.

(21) Appl. No.: 16/928,972

(22) Filed: Jul. 14, 2020

(65) Prior Publication Data

US 2020/0343557 A1 Oct. 29, 2020

Related U.S. Application Data

(63) Continuation of application No. 16/550,091, filed on Aug. 23, 2019, now Pat. No. 10,734,653, which is a
(Continued)

(51) Int. Cl.
*H01M 4/02* (2006.01)
*H01M 4/62* (2006.01)
(Continued)

(52) U.S. Cl.
CPC ......... *H01M 4/625* (2013.01); *H01M 4/0404* (2013.01); *H01M 4/134* (2013.01);
(Continued)

(58) Field of Classification Search
CPC ...................................................... H01M 4/02
See application file for complete search history.

(56) References Cited

U.S. PATENT DOCUMENTS

| | | | |
|---|---|---|---|
| 5,436,093 | A | 7/1995 | Huang et al. |
| 6,031,711 | A | 2/2000 | Tennent et al. |

(Continued)

FOREIGN PATENT DOCUMENTS

| | | |
|---|---|---|
| CA | 2032137 C | 11/1990 |
| CN | 100541870 | 9/2009 |
| WO | 2018122368 A1 | 7/2018 |

OTHER PUBLICATIONS

K.S. Novoselov et al. "Electiric Field Effect in Atomically Thin Carbon Films" Science; 306(5696), pp. 666-669; Oct 22, 2004.
(Continued)

*Primary Examiner* — Jacob B Marks
(74) *Attorney, Agent, or Firm* — Paradice & Li LLP

(57) ABSTRACT

In some embodiments, a lithium ion battery includes a first substrate, a cathode, a second substrate, an anode, and an electrolyte. The cathode is arranged on the first substrate and can contain a cathode mixture including $Li_xS_y$, wherein x is from 0 to 2 and y is from 1 to 8, and a first particulate carbon. The anode is arranged on the second substrate and can contain an anode mixture containing silicon particles, and a second particulate carbon. The electrolyte can contain a solvent and a lithium salt and is arranged between the cathode and the anode. In some embodiments, the first particulate carbon or the second particulate carbon contains
(Continued)

carbon aggregates comprising a plurality of carbon nanoparticles, each carbon nanoparticle comprising graphene. In some embodiments, the particulate carbon contains carbon meta particles with mesoporous structures.

20 Claims, 11 Drawing Sheets

Related U.S. Application Data continuation of application No. PCT/US2019/029445, filed on Apr. 26, 2019, application No. 16/928,972, which is a continuation-in-part of application No. 16/208,187, filed on Dec. 3, 2018.

(60) Provisional application No. 62/664,749, filed on Apr. 30, 2018, provisional application No. 62/594,992, filed on Dec. 5, 2017.

(51) Int. Cl.

| | | |
|---|---|---|
| *H01M 4/04* | (2006.01) | |
| *H01M 4/134* | (2010.01) | |
| *H01M 4/136* | (2010.01) | |
| *H01M 4/1395* | (2010.01) | |
| *H01M 4/1397* | (2010.01) | |
| *H01M 4/38* | (2006.01) | |
| *H01M 4/58* | (2010.01) | |
| *H01M 4/66* | (2006.01) | |
| *H01M 10/0525* | (2010.01) | |
| *H01M 10/0567* | (2010.01) | |
| *H01M 10/058* | (2010.01) | |
| *H01M 50/44* | (2021.01) | |
| *H01M 50/411* | (2021.01) | |

(52) U.S. Cl.
CPC ......... *H01M 4/136* (2013.01); *H01M 4/1395* (2013.01); *H01M 4/1397* (2013.01); *H01M 4/386* (2013.01); *H01M 4/5815* (2013.01); *H01M 4/661* (2013.01); *H01M 10/058* (2013.01); *H01M 10/0525* (2013.01); *H01M 10/0567* (2013.01); *H01M 50/411* (2021.01); *H01M 50/44* (2021.01); *H01M 2004/021* (2013.01)

(56) References Cited

U.S. PATENT DOCUMENTS

| | | | |
|---|---|---|---|
| 6,099,960 | A | 8/2000 | Tennent et al. |
| 6,757,154 | B2 | 6/2004 | Reynolds, III et al. |
| 6,830,595 | B2 | 12/2004 | Reynolds, III |
| 7,071,258 | B1 | 7/2006 | Jang et al. |
| 7,206,189 | B2 | 4/2007 | Reynolds, III |
| 7,465,519 | B2 | 12/2008 | Tang et al. |
| 7,623,340 | B1 | 11/2009 | Song et al. |
| 7,824,651 | B2 | 11/2010 | Zhamu et al. |
| 7,842,421 | B2 | 11/2010 | Mikhaylik |
| 7,875,219 | B2 | 1/2011 | Zhamu et al. |
| 8,119,288 | B2 | 2/2012 | Zhamu et al. |
| 8,132,746 | B2 | 3/2012 | Zhamu et al. |
| 8,241,793 | B2 | 8/2012 | Zhamu et al. |
| 8,415,054 | B2 | 4/2013 | Skotheim et al. |
| 8,497,225 | B2 | 7/2013 | Zhamu et al. |
| 8,524,067 | B2 | 9/2013 | Zhamu et al. |
| 8,617,748 | B2 | 12/2013 | Mikhaylik et al. |
| 8,624,222 | B2 | 1/2014 | Liu et al. |
| 8,748,043 | B2 | 1/2014 | Mikhaylik |
| 8,936,870 | B2 | 1/2015 | Affinito et al. |
| 9,005,809 | B2 | 4/2015 | Wilkening et al. |
| 9,034,421 | B2 | 5/2015 | Mikhaylik et al. |
| 9,040,201 | B2 | 5/2015 | Affinito et al. |
| 9,190,667 | B2 | 11/2015 | Zhamu et al. |
| 9,190,694 | B2 | 11/2015 | Lopez et al. |
| 9,246,185 | B2 | 1/2016 | Kretschmar et al. |
| 9,419,274 | B2 | 8/2016 | Wilkening et al. |
| 9,577,243 | B2 | 2/2017 | Schmidt et al. |
| 10,020,494 | B2 | 7/2018 | Wang et al. |
| 10,083,801 | B2 | 9/2018 | Zhamu et al. |
| 2009/0022649 | A1 | 1/2009 | Zhamu et al. |
| 2009/0028777 | A1 | 1/2009 | Zhamu et al. |
| 2015/0210558 | A1 | 7/2015 | Dickinson et al. |
| 2015/0291431 | A1 | 10/2015 | Tang et al. |
| 2016/0027934 | A1 | 1/2016 | Noyes |
| 2016/0207291 | A1 | 7/2016 | Dimitrakopoulos et al. |
| 2017/0062821 | A1 | 3/2017 | Tour et al. |
| 2018/0090768 | A1* | 3/2018 | Duan ............... H01G 11/26 |

OTHER PUBLICATIONS

T. Takamura et al. "A key technology to improve the cyclic performances of carbonaceous materials for lithium secondary battery anodes" Science Direst Journal of Power Sources vol. 68, Issue 1, Sep. 1997, pp. 114-119.

J. Rothlisberger et al. "Ab Initio Molecular Dynamics Investigation of Singlet C2H2Li2: Determination of the Ground State Structure and Observation of LiH Intermediates" J. American Chemical Society 1995, 117, 42-48.

C. Menachem et al. "Characterization of Lithiated Natural Graphite Before and After Mild Oxidation" Science Direct Journal of Power Sources vol. 76, Issue 2, Dec. 1, 1998, pp. 180-185.

C. Menachem et al. "Characterization of modified NG7 graphite as an improved anode for lithius-ion batteries" Science Direct Journal of Power Sources vol. 68, Issue 2, Oct. 1997, pp. 277-282.

Y. Ein-Eli et al. "Chemical Oxidation: A Route to Enhanced Capacity in Li-Ion Graphite Anodes" Journal of the Electrochemical Society 1997 vol. 144, issue 9, pp. 2968-2973.

P. Maguire et al. "Continuous In-flight Synthesis for On-Demand Delivery of Ligand-Free Colloidal Gold Nanoparticles", Nano Letters; 17(3); pp. 1336-1343; Mar. 8, 2017.

S. Dabrowska et al. "Current Trends in the Development of Microwave Reactors for the Synthesis of Nanomaterials in Laboratories and Industries: A Review" Crystals; 8(10); Oct. 2018; p. 379.

M. Zheng et al. "Activated graphene with tailored pore structure parameters for long cycle-life lithium—sulfur batteries" Nano Res. 2017, 10(12): 4305-4317.

J.S. Xue et al."Dramatic Effect of Oxidation on Lithium Insertion in Carbons Made from Epoxy Resins" Journal of the Electrochemical Society 1995 vol. 142, issue 11, 3668-3677.

F. Disma et al."Effect of Mechanical Grinding on the Lithium Intercalation Process in Graphites and Soft Carbons" Journal of the Electrochemical Society 1996 vol. 143, issue 12, 3959-3972.

Y. Wu et al."Effects of catalytic oxidation on the electrochemical performance of common natural graphite as an anode material for lithium ion batteries" Science Direct Electrochemistry Communications vol. 2, Issue 4, Apr. 1, 2000, pp. 272-275.

K.H. An et al."Electrochemical Properties of High-Power Supercapacitors Using Single-Walled Carbon Nanotube Electrodes" Advanced Functional Materials/Vol. 11, Issue 5. Oct. 2, 2001.

Y. Qiu et al."Explosive thermal reduction of graphene oxide-based materials: mechanism and safety implications" NIH Public Access Author Manuscript School of Engineering, Brown University, 182 Hope St., Providence, RI, USA, 02912. carbon NY. Jun. 2014; 72: 215-223. doi:10.1016/j.carbon.2014.02.005.

R. Yazami et al."High reversible capacity carbon-lithium negative electrode in polymer electrolyte" Science Direct Journal of Power Sources vol. 54, Issue 2, Apr. 1995 pp. 411-415.

T. Zheng et al."High-Capacity Carbons Prepared from Phenolic Resin for Anodes of Lithium-Ion Batteries" Journal of The Electrochemical Society 1995 vol. 142, issue 11, L211-L214.

Z. Lu et al."Improving Li anode performance by a porous 3D carbon paper host with plasma assisted sponge carbon ;Dating" Energy Storage Materials 11 (2018) 47-56.

(56) References Cited

OTHER PUBLICATIONS

S. Zhang "Liquid electrolyte lithium/sulfur battery: Fundamental chemistry, problems, and solutions" Science Direct. Journal of Power Sources vol. 231, Jun. 1, 2013, pp. 153-162.
R. Korthauer (Ed.) " Lithium-Ion Batteries: Basics and Applications" Publisher, Springer-Verlag Berlin Heidelberg Copyright Aug. 7, 2018.
H. Buqa et al. "Modified carbons for improved anodes in lithium ion cells" Science Direct Journal of Power Sources vol. 97-98, Jul. 2001, pp. 122-125.
E. Lee et al. "Li Absorption and Intercalation in Single Layer Graphene and Few Layer Graphene by First Principles" Nano Letters; 12(9), pp. 4624-4628; Sep. 12, 2012.
Y. Shi et al. "Material and Structural Design of Novel Binder Systems for High-Energy, High-Power Lithium-Ion Batteries" Published as part of the Accounts of Chemical Research special issue "Energy Storage: Complexities AmongMaterials and Interfaces at Multiple Length Scales". DOI: 10.1021/acs.accounts.7b00402 Acc. Chem. Res. 2017, 50, 2642-2652.
K. Ji et al. "Lithium intercalation into bilayer graphene" Nature Communications; 19(1); pp. 1-10; Jan. 17, 2019.
K. Ji et al. "Lithium intercalation into bilayer graphene" Nature Communications (2019) 10:275 I https://doi.org/10.1038/s41467-018-07942-z I www.nature.com/naturecommunications.
K. Jurewicz et al. "Supercapacitors from nanotubes/polypyrrole composites" Science Direct Chemical Physics Letters vol. 347, Issues 1-3, Oct. 2001, pp. 36-40.
J.E. Huang et al. "Well-dispersed single-walled carbon nanotube/polyaniline composite films" Science Dierct Carbon vol. 41, Issue 14, 2003, pp. 2731-2736.
A. Mistry et al. ""Shuttle" in Polysulfide Shuttle: Friend or Foe?" Journal of Physical Chemistry C; 122(42); pp. 23845-23851; Oct. 5, 2018.
I. Son et al., "Graphene balls for lithium rechargeable batteries with fast charging and high volumetric energy densities", Nature Communications; 8(1); pp. 1-11; Nov. 16, 2017.
H. Wang et al., "Graphene-Wrapped sulfur particles as a rechargeable lithium-sulfur battery cathode material with high capacity and cycling stability", Nano Letters; 11(7); pp. 2644-2647; Jul. 13, 2011.
Agostini, M. et al., "A high-power and fast charging Li-ion battery with outstanding cycle-life", Scientific Reports; 7 (1); pp. 1-7; Apr. 24, 2017.
Zhou, L et al., "Recent developments on and prospects for electrode materials with hierarchical structures for lithium-ion batteries", Advanced Energy Materials; 8(6); p. 1701415; Feb. 2018.
Rodrigues, M. et al., "A materials perspective on Li-ion batteries at extreme temperatures", Nature Energy; 2(8); pp. 1-4; Jul. 24, 2017.
Zhang, H et al., "Three-dimensional bicontinuous ultrafast-charge and -discharge bulk battery electrodes", Nature Nanotechnology; 6(5); pp. 277-281; May 2011.

\* cited by examiner

| | MATERIAL | THEORETICAL CAPACITY (mAh/g) | PRACTICAL CAPACITY (mAh/g) |
|---|---|---|---|
| ANODES | Li | 3861 | varies |
| | $C_6$ | 372 | ~300 |
| | $Li_{22-x}Si_{5-y}$ | 2011-4199 | >1000 |
| | Si | 4199 | >2000 |
| CATHODES | LCO | 295 | 140 |
| | NMC | 301 | 165 |
| | $Li_2S$ | 1167 | >450 |
| | S | 1672 | >700 |
| | CELL CONFIGURATION | THEORETICAL SPECIFIC ENERGY (Wh/kg) | PRACTICAL SPECIFIC ENERGY (Wh/kg) |
| FULL CELL | $NMC/LiC_6$ | 302 | 160 |
| | $Li_2S/Li_{22-x}Si_{5-y}$ | >768 | >345 |
| | $Li_2S/Si$ | 1139 | >600 |

LITHIUM ION BATTERY AND BATTERY MATERIALS

RELATED APPLICATIONS

This application is a continuation application and claims priority to U.S. patent application Ser. No. 16/550,091, filed on Aug. 23, 2019 and entitled "Lithium Ion Battery and Battery Materials" and to International Patent Application No. PCT/US2019/029445, filed on Apr. 26, 2019 and entitled "Lithium Ion Battery and Battery Materials", which claims priority to U.S. Provisional Patent Application No. 62/664,749, filed on Apr. 30, 2018, and entitled "Lithium Ion Battery and Battery Materials" and is a continuation-in-part part application and claims priority to U.S. patent application Ser. No. 16/208,187, filed on Dec. 3, 2018 and entitled "Lithium Ion Battery and Battery Materials", which claims priority to U.S. Provisional Patent Application No. 62/594,992, filed on Dec. 5, 2017, all of which are assigned to the assignee hereof. The disclosures of all prior applications are considered part of and are incorporated by reference in this patent application.

BACKGROUND

Secondary (rechargeable) lithium ion batteries are used in many applications including automotive, mobile electronic devices, and small or large electrical energy storage systems. In contrast with conventional lithium ion battery systems, the electrodes in new lithium ion batteries, such as Li/S batteries, are composed of abundant elements and therefore promise to be lower cost than conventional batteries. Additionally, Li/S batteries offer higher specific energy and energy density at similar or better performance. However, commercialization has been hindered by performance limitations and practical manufacturing challenges.

One challenge still hindering the practical development of Li/S batteries is the high solubility of the polysulfides in conventional electrolytes. The dissolving of the polysulfides leads to poor battery properties (e.g., a loss of capacity upon repeated cycling). One mechanism by which the degradation can occur is the dissolved polysulfide anions can migrate through the electrolyte and reach the anode, where they react to form insoluble products on its surface and impede battery operation.

Conventional lithium ion batteries (with conventional cathode and anode materials) have insufficient battery characteristics such as battery life and performance. For example, sulfur-containing cathode materials tend to have low conductivity, and therefore conductive carbon is typically added to the cathode to increase the electrical conductivity. In cases where lithium-sulfur batteries use elemental Li metal in the anode, the resulting batteries tend to have poor electrical cycling performance and stability.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a lithium (Li) ion battery including a cathode formed of few layer graphene (FLG) sheets defining a three-dimensional (3D) carbon-based multi-modal structure, which can include a plurality of interconnected channels configured to provide ion transport, a plurality of functional pores configured to retain elemental sulfur or assist with polysulfide microconfinement, and a plurality of aggregates formed from two or more FLG sheets sintered together and configured to provide electric conduction between contact points of the two or more FLG sheets. The Li ion battery can include an electroactive material including any one or more of elemental sulfur or lithium sulfide ($Li_2S$) infiltrated into any one or more of the plurality of functional pores or the plurality of interconnected channels of the 3D carbon-based multi-modal structure. The polysulfide can include $Li_xS_y$, where x is from 0 to 2 and y is from 1 to 8.

The Li ion battery can include a first substrate, where the cathode is disposed on the first substrate, and a second substrate positioned opposite to the first substrate. The first or the second substrate includes any one or more of metal foil, carbon foam, metal foam, carbon paper, carbon fibers, carbon nanofibers, carbon cloth, or particulate carbon. An anode can be disposed on the second substrate, where the anode includes the three-dimensional (3D) carbon-based multi-modal structure. The anode can include silicon-containing materials including any one or more of an elemental silicon or a lithium and silicon containing material.

The FLG sheets, in some aspects, can include up to 15 layers of graphene. At least one of the aggregates can include more than 99% carbon. A median dimension of each of the aggregates ranges between approximately 0.1 microns and approximately 50 microns. A median surface area of each of the aggregates is between approximately 10 $m^2$/g and approximately 300 $m^2$/g when measured via a Brunauer-Emmett-Teller (BET) method using nitrogen as an adsorbate. At least one of the aggregates has an electrical conductivity between approximately 500 S/m and approximately 20,000 S/m.

Another innovative aspect of the subject matter described in this disclosure can be implemented in a lithium (Li) ion battery including an anode formed of few layer graphene (FLG) sheets defining a three-dimensional (3D) carbon-based bi-modal structure, which can include a plurality of interconnected channels configured to provide ion transport, and a plurality of aggregates formed from two or more FLG sheets sintered together and configured to provide electric conduction between contact points of the two or more FLG sheets. The Li ion battery can include an electroactive material including a silicon (Si) containing material configured to form a lithium-silicon (Li—S) compound upon exposure to Li. The anode can include one or more of graphene oxide (GO), a polymeric material, or a binder.

Yet another innovative aspect of the subject matter described in this disclosure can be implemented as method of producing a lithium (Li) battery electrode, the method including forming aggregates of graphene sheets from a carbon-containing vapor flow stream independent of a seed particle, defining an interconnected network of three-dimensional (3D) hierarchical mesoporous structures based on the aggregates, the interconnected network configured to retain one or more electroactive electrode materials, and depositing the aggregates onto an electrically conductive current collector.

The method can include infiltrating lithium-containing material into the aggregates, where the lithium-containing material is configured to provide electric conduction throughout the interconnected network, and intercalating Li obtained from the lithium-containing material between the graphene sheets within any one or more of the aggregates. The method can include incorporating polymeric artificial solid-electrolyte interfaces (SEIs) into the aggregates. The SEIs can include any one or more of a cyclized polyacrylonitrile conductive binder, a carbonized polyacrylonitrile conductive binder or an acrylonitrile monomer precursor solution. The method can include slurry casting the aggregates of graphene sheets onto a copper foil.

DETAILED DESCRIPTION

Figure 1A:
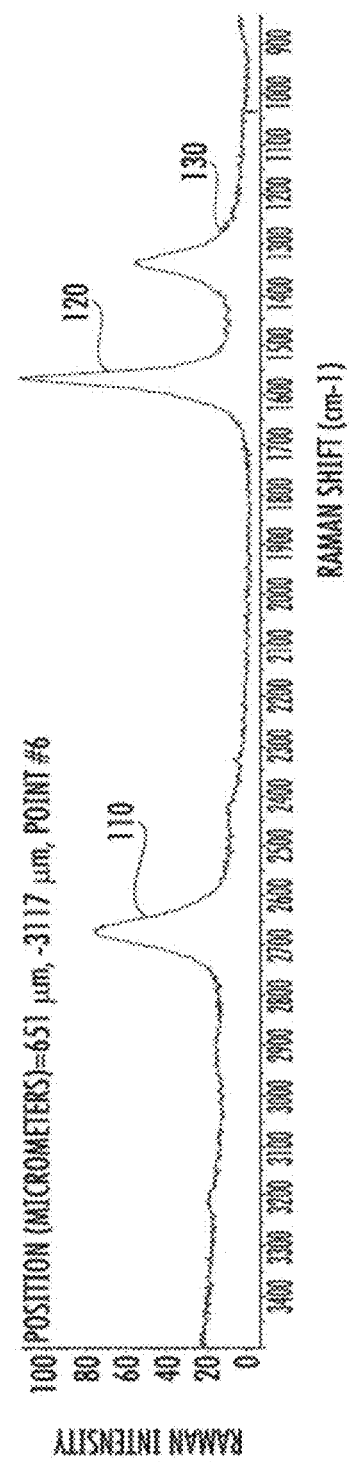
FIG. 1A shows a Raman spectrum from particulate carbon containing graphene, in accordance with some embodiments.

In the present disclosure lithium ion batteries with improved cathodes, anodes, separators and/or electrolytes are described. The electrodes (i.e., the anodes and cathodes) can contain a substrate, such as a carbon substrate and/or a metal foil substrate.

In some embodiments, the lithium ion batteries described herein are Li/S batteries, or Si—S-graphene batteries. The present cathodes can contain the substrate and a cathode mixture containing S and/or $Li_2S$ and a carbon additive (e.g., particulate carbon). In some embodiments, the cathode mixtures can also contain conventional lithium ion battery cathode materials such as nickel cobalt manganese (NCM) or lithium iron phosphate (LFP). The present anodes can contain the substrate and an anode mixture containing silicon and/or lithiated silicon particles, and a carbon additive (e.g., particulate carbon).

In some cases, the cathode and/or anode materials are arranged on a substrate. Substrates for the present cathodes and/or anodes can be dense or porous and can contain any electrically conductive material. The substrates can contain a single layer, multiple layers, an interpenetrating network of conductive and non-conductive materials, and/or conductive porous or solid films or coatings on non-conductive base materials.

The electrolytes of the present lithium ion batteries can contain one or more solvents, a lithium salt, and optionally a redox additive. A separator can also optionally be used, where the separator is saturated with the electrolyte and is arranged between the anode and cathode. The separator can contain a polymeric blend and can optionally contain incorporated electrically non-conductive particles.

Compared to conventional Li/S and lithium ion batteries, the materials and the structure of the cathodes and anodes and the composition of the electrolytes described herein improves the performance, manufacturability and/or stability of the batteries.

For example, although not to be limited by theory, the structure of the cathode of the present lithium ion batteries improves the longevity of Li/S batteries compared to batteries with conventional cathodes by providing high surface area with many small pockets where the polysulfides formed during charging and discharging are trapped. As a result, the migration of the polysulfides to the anode is mitigated which improves battery performance, for example, by increasing efficiency and mitigating the capacity loss per cycle.

In some embodiments, the present carbon additives in the cathode and/or anode have improved properties compared to conventional carbon additive materials, such that batteries containing electrodes utilizing the present carbon additives have improved battery performance (e.g., improved capacity or stability). For example, the present carbon additive in the cathode and/or anode can contain particulate carbon with high compositional purity, high electrical conductivity, and a high surface area. In some embodiments, the particulate carbon has a mesoporous structure with a wide distribution of pore sizes (e.g., a multimodal distribution). Not to be limited by theory, the improved carbon additives described herein are beneficial to both electrodes because they have high electrical conductivity and high surface area to efficiently conduct electrons (e.g., with low resistive losses) to the abundant electrode/electrolyte interfaces (e.g., enabled by the high surface area particulate carbons). Not to be limited by theory, the improved carbon additives described herein are also beneficial to cathodes because the small pores in the mesoporous structure can trap some portion of the created polysulfides preventing them from migrating through the electrolyte to the anode.

As another example, not to be limited by theory, the use of silicon in the anode of the present lithium ion batteries improves the performance and safety of the batteries compared to conventional anodes made from elemental Li. Elemental Li is highly reactive, which creates safety issues during battery operation, and increases the cost and complexity of producing the batteries using these materials as anodes. Elemental Li electrodes in Li/S batteries also suffer from poor performance (e.g., low coulombic efficiency) and poor durability (e.g., capacity losses during cycling).

As another example, not to be limited by theory, the redox additives in the present electrolytes improve the longevity of Li/S batteries compared to batteries with conventional electrolytes by preventing the polysulfides from migrating to the anode. In different embodiments, this can be accomplished using different mechanisms including promoting the reaction of the polysulfides into $Li_2S$ and sulfur and tethering the polysulfides at the cathode as well as by the formation of a more stable solid/electrolyte interface at the anode and/or the cathode. In different embodiments, the sulfur and/or $Li_2S$ can be mixed with conventional cathode materials such as NCM or LFP to improve performance and provide an overcharge safety mechanism.

Improved cathodes, anodes, electrolytes, and components of each for lithium ion batteries are described in more detail below. The improved battery components can be used together in the same battery or can be used in combination with conventional components to create an improved battery. For example, an improved sulfur-based cathode can be used with a conventional anode in an improved lithium ion battery. Alternatively, a conventional active cathode can be used in combination with an improved anode to create an improved lithium ion battery.

Cathodes for Lithium Ion Batteries

In some embodiments, the cathodes for lithium ion (e.g., Li/S) batteries contain a substrate and a cathode mixture containing a sulfur material such as elemental S and/or $Li_2S$. In some embodiments, the cathode mixture contains a material containing sulfur, one or more particulate carbon materials, and optionally may include a binder. The cathode mixture can be formed from any process. For example, the cathode mixture can be formed using wet coating processes where a slurry containing the cathode mixture and one or more solvents (where the solvent can be fully or partially removed upon drying) is deposited onto a substrate or using dry deposition processes. One example of a dry deposition process is using a plasma torch where components (e.g., particles and/or other feedstock materials) are deposited onto a substrate using a plasma jet. In some embodiments, the cathode mixture contains a material containing sulfur, one or more particulate carbon materials, a conventional lithium ion cathode material such as NCM or LFP, and optionally may include a binder.

In some embodiments, a Li/S battery with a sulfur-containing cathode is fabricated using the methods described herein, including depositing sulfur-containing cathodic materials within the pores of a structured composite material containing an electrically conductive material (e.g., the particulate carbon).

In different embodiments, the cathodes can contain S, $Li_2S$, $Li_xS_y$ (where x=0-2 and y=1-8), doped S, doped $Li_2S$, or combinations thereof. In some embodiments, the cathodes can contain composite materials containing S, $Li_2S$, $Li_xS_y$, doped S, doped $Li_2S$, doped $Li_xS$, NCM, LFP, or combinations thereof, either in the form of a solid or as a suspension/dissolved solution. Some examples of doped S, doped $Li_2S$, or doped $Li_xS$ include S, $Li_2S$, or $Li_xS$, doped with P, N, C and/or F.

In some embodiments, the cathode contains particles containing $Li_xS_y$ (e.g., where x=0-2 and y=1-8), with particle sizes from 5 nm to 100 microns. As used herein, $Li_xS_y$ can refer to doped or undoped $Li_xS_y$ materials. Some non-limiting examples of $Li_xS_y$ materials include S, $Li_2S$, doped S, doped $Li_2S$, or combinations thereof. In some embodiments, the particles are contained in a liquid phase mixture containing $Li_xS_y$.

In some embodiments, the cathodes contain $Li_xS_y$ complexed with solvents such as acetonitrile, or any of the cathode slurry solvents described herein. In some embodiments, the cathodes contain $Li_xS_y$ complexed with a cathode solvent (e.g., acetonitrile) and with an active redox additive (e.g., a metallocene such as ferrocene).

In some embodiments, the cathodes contain a binder containing polyethylene oxide/polyvinylpyrrolidone (PEO/PVP), Nafion (i.e., a sulfonated tetrafluoroethylene-based fluoropolymer-copolymer), polyvinylidene difluoride (PvDF), and combinations thereof.

In some embodiments, the particulate carbon in the cathode has a mesoporous structure with a wide distribution of pore sizes (e.g., a multimodal distribution). For example, mesoporous particulate carbon can contain multimodal distribution of pores with sizes from 0.1 nm to 10 nm, from 10 nm to 100 nm, from 100 nm to 1 micron, and/or larger than 1 micron. For example, the pore structure can contain pores with a bimodal distribution of sizes, including smaller pores (e.g., with sizes from 1 nm to 4 nm) and larger pores (e.g., with sizes from 30 to 50 nm). Not to be limited by theory, such a bimodal distribution of pore sizes in a mesoporous particulate carbon material can be beneficial in sulfur-containing cathodes in lithium ion batteries, because the smaller pores (e.g., 1 to 4 nm in size) can confine the sulfur (and in some cases control of saturation and crystallinity of sulfur and/or of generated sulfur compounds) in the cathode, and the larger pores (e.g., 30 to 50 nm in size, or pores greater than twice the size of solvated lithium ions) can enable rapid diffusion (or, mass transfer) of solvated lithium ions in the cathode.

In some embodiments, the mesoporous particulate carbon and cathodic active material form a meta particle framework, where the cathodic electroactive materials (e.g., elemental sulfur) are arranged within the mesoporous carbon pores/channels. Not to be limited by theory, the meta particle framework can provide a low resistance electrical contact between the insulating cathodic electroactive materials (e.g., elemental sulfur) and the current collector while providing high surface area structures that are beneficial to battery capacity. Not to be limited by theory, the mesoporous particulate carbon can also benefit cathode stability by trapping some portion of the created polysulfides preventing them from migrating through the electrolyte to the anode. For example, the small pores in a mesoporous particulate carbon in a cathode can drive the creation of lower order polysulfides (such as S and $Li_2S$) and prevent the formation of the higher order soluble polysulfides (e.g., $Li_xS_y$ with y greater than 3) that facilitate lithium shuttle (i.e., loss) to the anode. As described herein, the structure of the particulate carbon and the cathode mixture of materials can be tuned during particulate carbon formation (e.g., within a microwave plasma or thermal reactor). In addition, cathodic electroactive materials (e.g., elemental sulfur) solubility and crystallinity in relation to lithium phase formation, can be confined/trapped within the micro/meso porous framework.

Anodes for Lithium Ion Batteries

In some embodiments, the anodes for lithium ion (e.g., Li/S) batteries contain a substrate (e.g., a metal foil substrate or a carbon substrate), and an anode mixture. In some embodiments, the anode mixture contains a silicon material (e.g., elemental Si, LiSi, silicon-doped carbon allotropes, and the graphene-containing particulate carbons described herein doped with Si), one or more particulate carbons (e.g., the graphene-containing and/or doped particulate carbons described herein), optionally graphene oxide, optionally one or more polymeric materials, and optionally one or more binders. The anode mixture can be formed from any process. For example, the anode mixture can be formed using wet coating processes where a slurry containing the anode mixture and one or more solvents (where the solvent can be fully or partially removed upon drying) is deposited onto a substrate or using dry deposition processes. One example of a dry deposition process is using a plasma torch where components (e.g., particles and/or other feedstock materials) are deposited onto a substrate using a plasma jet. In some embodiments, the anodes contain silicon-carbon composite materials, and/or silicon particles coated with carbon materials. In some embodiments, the anodes contain core-shell particles containing silicon, with either silicon or carbon materials at the core. In some embodiments, the anodes contain multi-layer particles containing one or more layers of silicon and one or more layers of carbon, with either silicon or carbon materials at the core. The core-shell and multi-layer particles can be any shape, including those with large surface areas and/or mesoporous geometries.

In some embodiments, a Li/S battery with a silicon-containing anode is fabricated using the methods described herein, including depositing silicon-containing anodic materials within the pores of a structured composite material containing a porous media and an electrically conductive material (e.g., the particulate carbon).

In some embodiments, the anodes contain a slurry containing silicon particles. The silicon particles can contain elemental silicon or lithium-silicon compounds and carbon composites thereof. Some examples of lithium-silicon compounds are $Li_{22}Si_5$, $Li_{22-x}Si_{5-y}$ (where x=0-21.9, and y=1-4.9), and $Li_{22-x}Si_{5-y-z}Mz$ (where x=0-21.9, y=1-4.9, z=1-4.9. and M is S, Se, Sb, Sn, Ga, or as). The silicon materials can be amorphous, crystalline, semi-crystalline, nano-crystalline, or poly-crystalline in different embodiments. The silicon particles can be nanoparticles (i.e., with median diameter below 50 nm, or about 100 nm, or about 500 nm, or about 1 micron), or micron sized particles with diameters from about 500 nm to about 10 microns.

In some embodiments, the anodes contain graphene oxide. In some embodiments, the graphene oxide provides oxygen to the materials in the anode during processing and/or operation. In other embodiments, the oxygen can be provided to the materials in the anode via another method, such as by incorporating an oxygen containing compound other than graphene oxide into the anode.

In some embodiments, the anodes contain one or more polymeric materials, such as polyacrylonitrile (PAN). In some cases, the polymeric materials are carbonized (e.g., through a higher than room temperature anneal in an inert gas) to form a phase of conductive carbon in the anode. In some cases, the polymeric material will remain a polymer in the anode, and act as a binder for particulate materials forming the anode. For example, polythiophene, PvDF-HFP, CMC, Nafion, PAN, SBR, or combinations thereof, can be used as binders in the anode.

In some embodiments, the anode contains an active anodic material and a particulate carbon, where the particulate carbon has a mesoporous structure with a wide distribution of pore sizes (e.g., a multimodal distribution). In some embodiments, the anode includes silicon-containing anodic materials within the pores of a mesoporous particulate carbon. In some embodiments, the mesoporous particulate carbon and anodic active material form a meta particle framework, where the anodic electroactive materials (e.g., silicon) are arranged within the mesoporous carbon pores/channels. Not to be limited by theory, the meta particle framework can provide a low resistance electrical contact between the anodic electroactive materials (e.g., elemental Si) and the current collector while providing high surface area structures that are beneficial to battery capacity. In some cases, the active silicon-containing anodic materials for the Li/S battery anode contain silicon-containing particles with average particle size less than 100 nm, or less than 50 nm. Not to be limited by theory, small Si particle sizes can be advantageous to prevent the Si containing anode materials from degrading, which commonly occurs in conventional silicon-containing anodes due to expansion of Si during battery operation. For example, in Li/S batteries with anodes containing large Si particles (e.g., with average diameters greater than about 100 nm, or greater than about 50 nm), the expanded larger particles can fracture during battery operation due to the large volume expansion of Si during battery operation. In contrast, in Li/S batteries with anodes containing smaller Si particles (e.g., with average diameters less than about 100 nm, or less than about 50 nm), the expanded size of the particles is relatively small, which mitigates fracturing of the Si particles during battery operation.

Carbon Particulates for Lithium Ion Batteries

The present lithium ion batteries can incorporate particulate carbon into the cathode, anode, and/or one or both substrates with improved properties compared to conventional carbon materials. For example, the particulate carbon can have high compositional purity, high electrical conductivity, and a high surface area compared to conventional carbon materials. In some embodiments, the particulate carbon also has a structure that is beneficial for battery properties, such as small pore sizes and/or a mesoporous structure. In some cases, a mesoporous structure can be characterized by a structure with a wide distribution of pore sizes (e.g., with a multimodal distribution of pore sizes). For example, a multimodal distribution of pore sizes can be indicative of structures with high surface areas and a large quantity of small pores that are efficiently connected to the substrate and/or current collector via material in the structure with larger feature sizes (i.e., that provide more conductive pathways through the structure). Some non-limiting examples of such structures are fractal structures, dendritic structures, branching structures, and aggregate structures with different sized interconnected channels (e.g., composed of pores and/or particles that are roughly cylindrical and/or spherical).

In some embodiments, the particulate carbon materials used in the substrates, cathodes and/or anodes described herein are produced using microwave plasma reactors and methods, such as any appropriate microwave reactor and/or method described in U.S. Pat. No. 9,812,295, entitled "Microwave Chemical Processing," or in U.S. Pat. No. 9,767,992, entitled "Microwave Chemical Processing Reactor," which are assigned to the same assignee as the present application, and are incorporated herein by reference as if fully set forth herein for all purposes. Additional information and embodiments for microwave plasma gas processing system methods and apparatuses to produce the carbon nanoparticles and aggregates described herein are also described in the related U.S. patents and patent applications mentioned in this disclosure.

In some embodiments, the substrate, cathode, and/or anode contains one or more particulate carbon materials. In some embodiments, the particulate carbon materials used in the lithium ion batteries described herein are described in U.S. Pat. No. 9,997,334, entitled "Seedless Particles with Carbon Allotropes," which is assigned to the same assignee as the present application, and is incorporated herein by reference as if fully set forth herein for all purposes. In some embodiments, the particulate carbon materials contain graphene-based carbon materials that comprise a plurality of carbon aggregates, each carbon aggregate having a plurality of carbon nanoparticles, each carbon nanoparticle including graphene, optionally including multi-walled spherical fullerenes, and optionally with no seed particles (i.e., with no nucleation particle). In some cases, the particulate carbon materials are also produced without using a catalyst. The graphene in the graphene-based carbon material has up to 15 layers. A ratio (i.e., percentage) of carbon to other elements, except hydrogen, in the carbon aggregates is greater than 99%. A median size of the carbon aggregates is from 1 micron to 50 microns, or from 0.1 microns to 50 microns. A surface area of the carbon aggregates is at least 10 m2/g, or is at least 50 m2/g, or is from 10 m2/g to 300 m2/g, or is from 50 m2/g to 300 m2/g, when measured using a Brunauer-Emmett-Teller (BET) method with nitrogen as the adsorbate. The carbon aggregates, when compressed, have an electrical conductivity greater than 500 S/m, or greater than 5000 S/m, or from 500 S/m to 20,000 S/m.

In some embodiments, the particulate carbon materials used in the substrates, cathodes and/or anodes in the lithium ion batteries described herein are described in U.S. Pat. No. 9,862,606 entitled "Carbon Allotropes," which is assigned to the same assignee as the present application, and is incorporated herein by reference as if fully set forth herein for all purposes. In some embodiments, the particulate carbon materials contain carbon nanoparticles comprising at least two connected multi-walled spherical fullerenes, and layers of graphene coating the connected multi-walled spherical fullerenes. Additionally, the carbon allotropes within the carbon nanoparticles can be well ordered. For example, a Raman spectrum of the carbon nanoparticle using 532 nm incident light can have a first Raman peak at approximately 1350 cm-1 and a second Raman peak at approximately 1580 cm-1, and a ratio of an intensity of the first Raman peak to an intensity of the second Raman peak is from 0.9 to 1.1. In some cases, the atomic ratio of graphene to multi-walled spherical fullerenes is from 10% to 80% within the carbon nanoparticles.

In some embodiments, the particulate carbon materials described herein are produced using thermal cracking apparatuses and methods, such as any appropriate thermal apparatus and/or method described in U.S. Pat. No. 9,862,602, entitled "Cracking of a Process Gas," which is assigned to the same assignee as the present application, and is incorporated herein by reference as if fully set forth herein for all purposes. Additional information and embodiments for thermal cracking methods and apparatuses to produce the carbon nanoparticles and aggregates described herein are also described in the in the related U.S. patents and patent applications mentioned in this disclosure.

In some embodiments, the particulate carbon used in the cathode and/or the anode contains more than one type of carbon allotrope. For example, the particulate carbon can contain graphene, spherical fullerenes, carbon nanotubes, amorphous carbon, and/or other carbon allotropes. Some of these carbon allotropes are further described in the related U.S. patents and patent applications mentioned in this disclosure. Additionally, the different carbon allotropes in the particulate carbon can have different morphologies, such as mixtures of low and high aspect ratios, low and high surface areas, and/or mesoporous and non-mesoporous structures. The use of particulate carbon with combinations of different allotropes (and in some cases different morphologies) can enhance the electrical and mechanical properties of battery electrodes. The mass ratio of a first carbon allotrope (e.g., with high electrical conductivity and/or a mesoporous structure) to a second carbon allotrope (e.g., a long chain carbon allotrope) in the particulate carbon can be from 70:30 to 99:1, or from 80:20 to 90:10, or from 85:15 to 95:5, or is about 85:15, or is about 90:10, or is about 95:5. For example, mesoporous carbon allotropes in the particulate carbon can provide high surface area and/or high electrical conductivity, and the addition of long chain (i.e., high aspect ratio) carbon allotropes in the particulate carbon can improve the mechanical strength, adhesion and/or durability of the battery, cathode and/or anode.

In some embodiments, the particulate carbon used in the cathode and/or the anode contains particles containing graphene (e.g., with one or more of the properties described herein), and particles containing long chain carbon allotropes (e.g., spherical fullerenes connected in a string-like arrangement, or carbon nanotube bundles). In some embodiments, the long chain carbon allotropes have aspect ratios greater than 10:1, or from 10:1 to 100:1, or about 10:1, or about 20:1, or about 50:1, or about 100:1. In some embodiments, the long chain carbon allotropes have dimensions from 50 nm to 200 nm wide by up to 10 microns in length, or from 10 nm to 200 nm wide by from 2 microns to 10 microns in length. Additional particles containing long chain carbon allotropes are described in the related U.S. patents and patent applications mentioned in this disclosure. The mass ratio of a graphene-containing carbon allotrope to a long chain carbon allotrope in the particulate carbon can be about 85:15, or about 90:10, or about 95:5. In some embodiments, the long chain carbon allotropes can interlock with other conductive (and in some cases structured, or mesoporous) carbon allotropes in the particulate carbon and can form an interlocked hybrid composite allotrope electrode with improved mechanical properties compared to electrodes without long chain carbon allotropes. In some embodiments, the addition of long chain (e.g., fibrous like) carbon increases the medium range (e.g., 1 micron to 10 microns) conductivity, and the distribution of the other carbon allotrope (e.g., prevents agglomeration of the other carbon allotrope, such as mesoporous graphene particles), while improving mechanical stability. Furthermore, the addition of long chain carbon allotropes can provide additional porosity around the carbon chain, which increases ion conductivity and mobility in the electrode. In one embodiment, these long chain fibers enable reduced calendaring pressure during fabrication (leading to electrodes with increased local voidage or porosity), while maintaining the same (or better) mechanical stability (i.e., tolerance to delamination and/or cracking) as electrodes without long chain carbons that are calendared at higher pressures. Reduced calendaring pressure can be advantageous because the higher porosity achieved using a lower pressure leads to increase ion conductivity and/or mobility. Additionally, in some embodiments, the addition of long chain carbon (e.g., fibers) can improve the elongation/strain tolerance over conventional slurry cast electrodes. In some cases, the elongation/strain tolerance (e.g., the maximum strain to failure, or the amount of performance degradation for a given strain) can be increased by as much as 50% over conventional slurry cast electrodes. In some embodiments, the addition of long chain carbon allotropes to the particulate carbon in a battery electrode enables the use of less binder, or the elimination of the binder, in the electrode.

In a non-limiting example, a mechanically robust, hybrid composite electrode film can contain particulate carbon with a combination of lower density (e.g., mesoporous), hierarchical graphene-containing particles (e.g., with particle sizes from 15 to 40 microns in diameter) and higher density particles containing long chains of connected spherical fullerenes (e.g., with sizes 50 to 200 nm wide by up to 10 microns in length). The mass ratio of graphene carbon allotropes to the long chain allotropes in this example is about 85:15. The particulate carbon in this example has high electrical conductivity (due to the high electrical conductivity of the graphene and/or spherical fullerenes), and the long chain allotropes provide mechanical reinforcement.

In conventional battery electrodes containing conductive and/or active materials particles, a binder is often used to improve the electrode mechanical properties. In some embodiments, the present battery electrodes are mechanically reinforced by long chain carbon allotropes, which enables the reduction or the elimination of a binder in the electrodes. For example, an interlocked hybrid composite allotrope electrode containing mesoporous graphene and long chain carbon allotropes can be formed with suitable mechanical properties without the use of a binder. Such electrodes with no binder can also be free-standing electrodes.

In some embodiments, an interlocked hybrid composite allotrope electrode can be formed by sintering the particulate carbon after the carbon and active materials are combined in the assembly (e.g., after slurry casting). This process can be used to consolidate and strengthen the composite electrode structure.

In a non-limiting example, carbon particles and aggregates containing graphite and graphene were generated using a microwave plasma reactor system, described in U.S. Pat. No. 9,767,992, entitled "Microwave Chemical Processing Reactor." The microwave plasma reactor in this example had a main body made from stainless steel with a quartz inner wall material. However, the quartz inner wall material is not needed in all cases, and similar carbon materials can be produced in reactors without quartz in or adjacent to the reaction zone. In some embodiments, it is beneficial to produce the particulate carbon in a reactor that does not have quartz in or adjacent to the reaction zone, because materials, such as oxygen, can decompose out of the quartz and become incorporated as unwanted impurities in the produced carbon materials. The reaction zone volume was approximately 45 cm$^3$. The precursor material was methane and was optionally mixed with a supply gas (e.g., argon). The flow rate of methane was from 1 to 20 L/min, the flow rate of the supply gas was from 0 to 70 L/min. With those flow rates and the tool geometry, the residence time of the gas in the reaction chamber was from approximately 0.001 second to approximately 2.0 seconds, and the carbon particle production rate was from approximately 0.1 g/hr to approximately 15 g/hr. After the aggregates were synthesized and collected, they were post-processed by annealing at a temperature from 1000 to 2200° C. in an inert atmosphere for a duration of approximately 60 to approximately 600 minutes.

The particles produced in this example contained carbon aggregates containing a plurality of carbon nanoparticles, where each carbon nanoparticle contained graphite and graphene and did not contain seed particles. The particles in this example had a ratio of carbon to other elements (other than hydrogen) of approximately 99.97% or greater.

FIG. 1A shows a Raman spectrum of the particulate carbon of this example, taken using 532 nm incident light. The particles in FIG. 1A were produced using precursors containing argon. The spectrum has a 2D-mode peak 110 at approximately 2690 cm-1, a G-mode peak 120 at approximately 1580 cm-1, and a D-mode peak 130 at approximately 1350 cm-1, and the 2D/G intensity ratio is greater than 0.5. The 2D/G intensity ratio for the particles produced in FIG. 1A is approximately 0.7.

The size of the aggregates in this example have a median of approximately 11.2 microns as synthesized, and approximately 11.6 microns after annealing. The size distribution of the as-synthesized aggregates had a 10th percentile of approximately 2.7 microns, and a 90th percentile of approximately 18.3 microns. The annealed aggregates size distribution had a 10th percentile of approximately 4.2 microns, and a 90th percentile of approximately 25.5 microns.

The electrical conductivity of the aggregates was measured after being compressed into pellets. The as-synthesized (i.e., before annealing) material had a conductivity of 800 S/m when compressed using 2000 psi of pressure, and a conductivity of 1200 S/m when compressed using 12,000 psi of pressure. The annealed material had a conductivity of 1600 S/m when compressed using 2000 psi of pressure, and a conductivity of 3600 S/m when compressed using 12,000 psi of pressure.

Figure 1B:
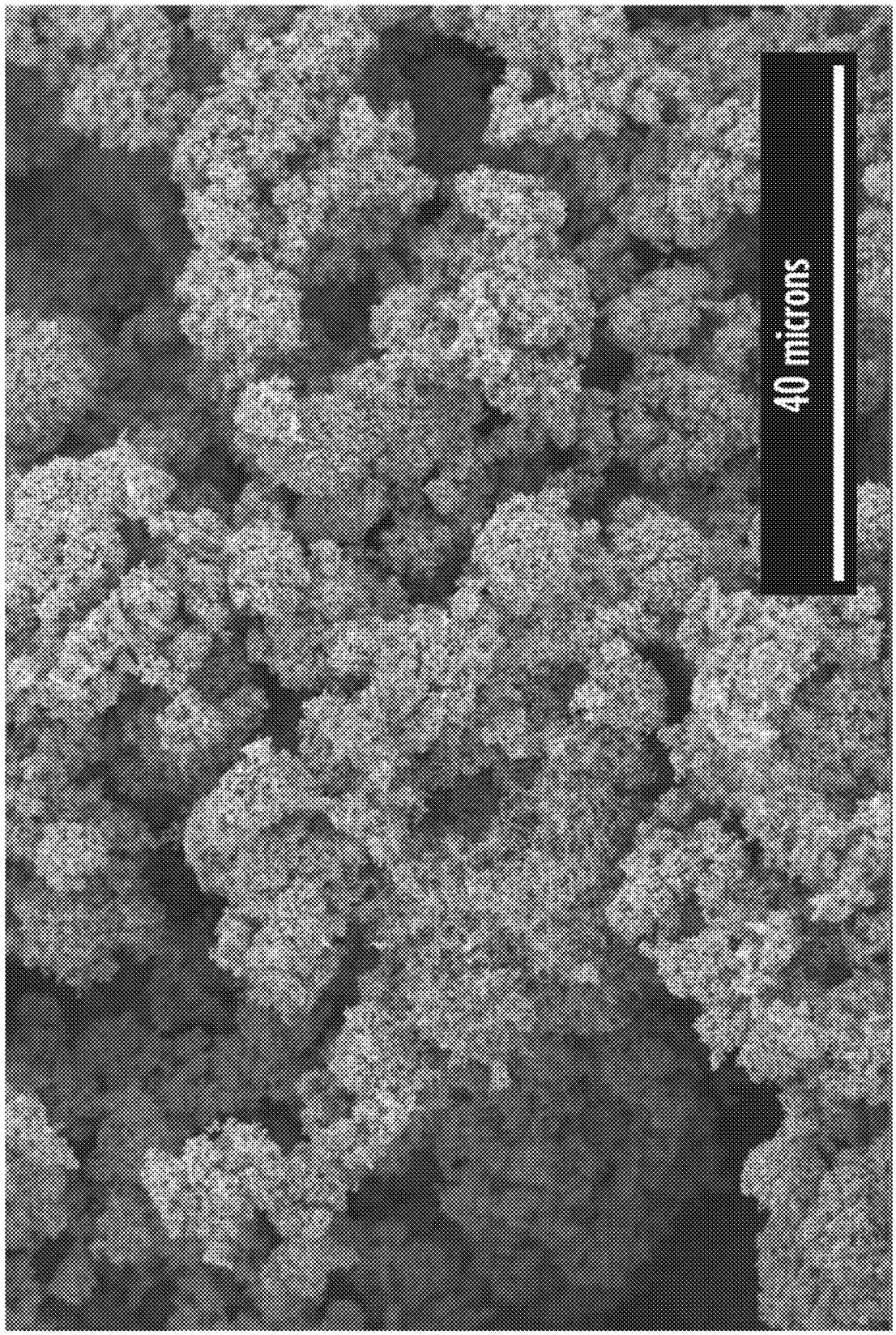
FIGS. 1B and 1C show scanning electron microscope (SEM) images from particulate carbon containing graphene, in accordance with some embodiments.
Figure 1C:
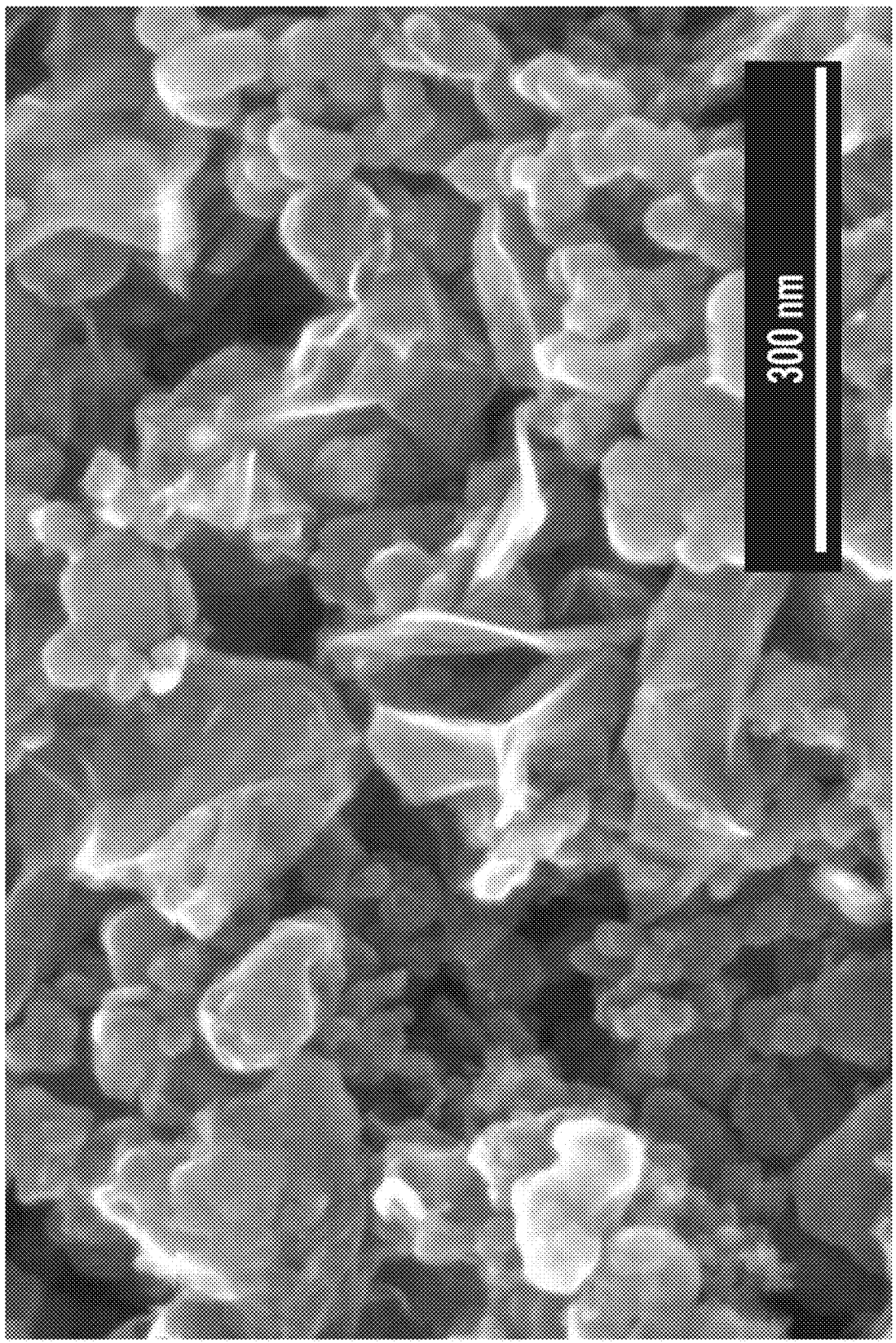
Figure 1D:
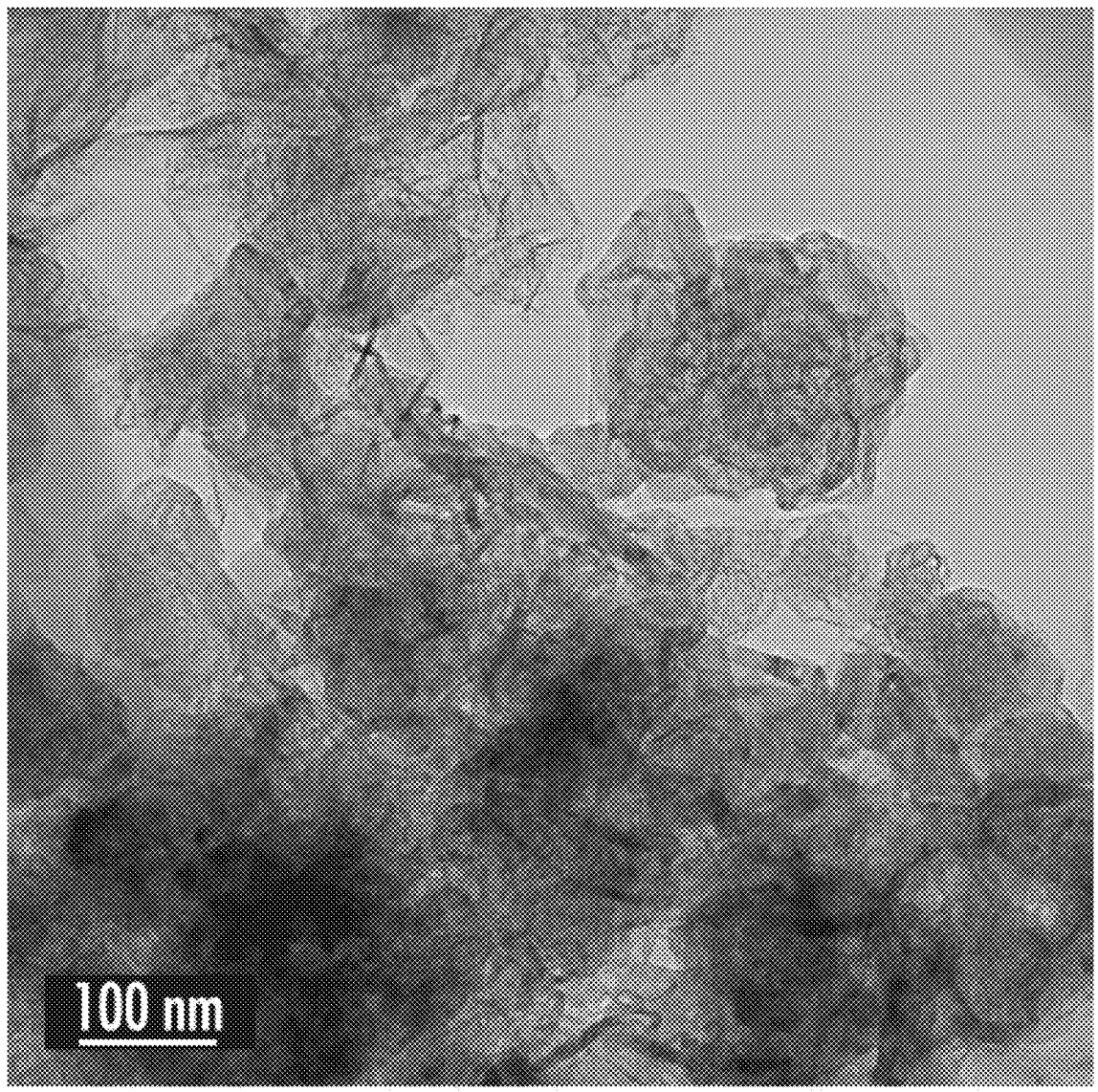
FIGS. 1D and 1E show transmission electron microscope (TEM) images from particulate carbon containing graphene, in accordance with some embodiments.
Figure 1E:
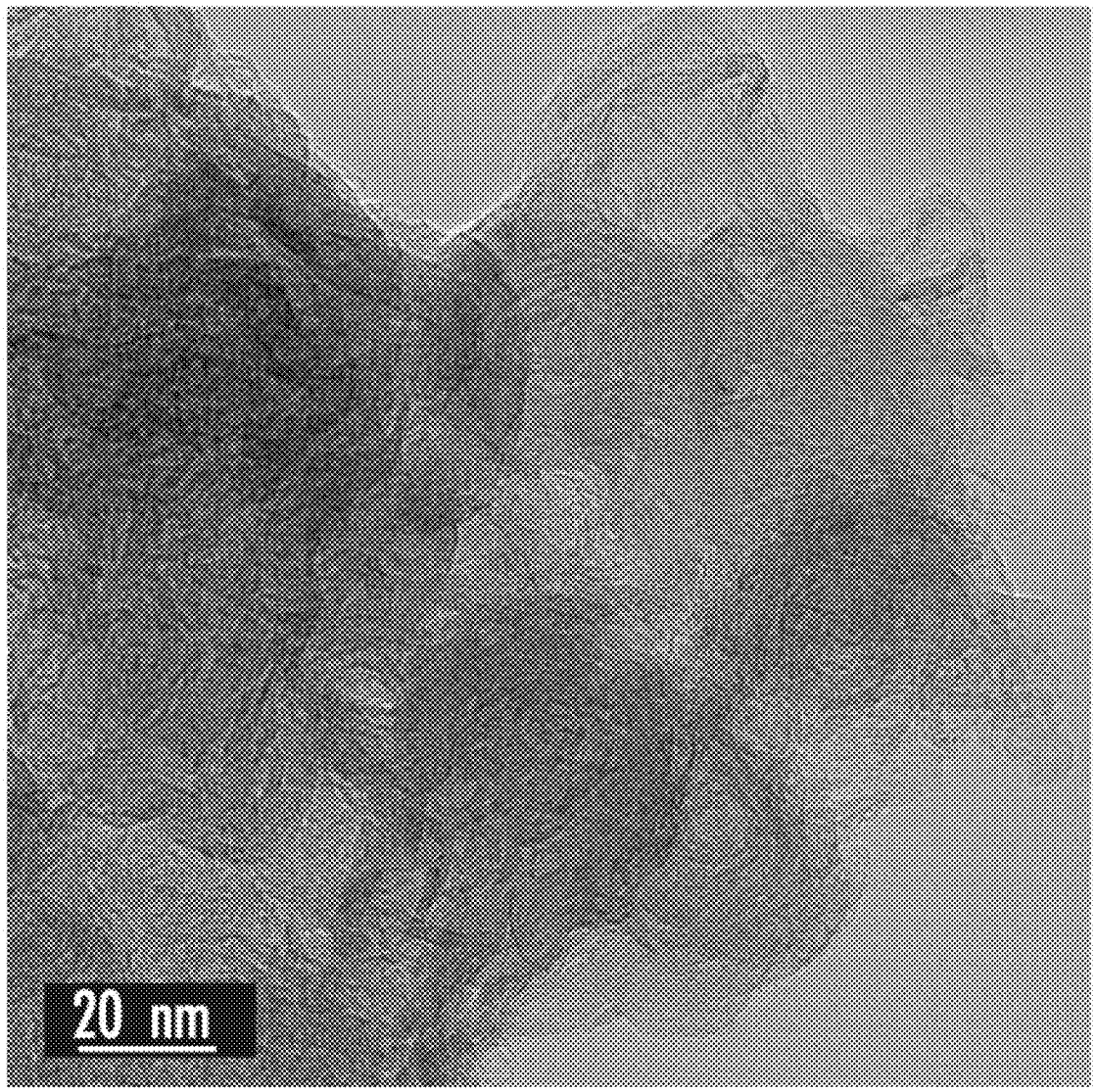

FIGS. 1B and 1C show SEM images, and FIGS. 1D and 1E show TEM images, of the carbon aggregates of the particulate carbon of this example showing graphite and graphene allotropes. The layered graphene is clearly shown within the distortion (wrinkles) of the carbon. The 3D structure of the carbon allotropes is also visible. The carbon allotropes in this example have a 3D structure with a hierarchical mesoporous, few layer, graphene structure with a specific edge-to-basal plane ratio. In some embodiments, the edge-to-basal plane ratio for the graphene in the present particulate carbon is about 1:10, or about 1:100, or from 1:10 to 1:100.

The surface area of the aggregates in this example were measured using the nitrogen BET method and the density functional theory (DFT) method. The surface area of the aggregates as determined by the BET method was approximately 85.9 m$^2$/g. The surface area of the aggregates as determined by the DFT method was approximately 93.5 m$^2$/g.

In contrast to conventionally produced carbon materials, the microwave plasma reactor produced carbon particles and aggregates in this example contained graphite and graphene had high purity, high electrical conductivities, and large surface areas. Additionally, these particles had Raman signatures indicating a high degree of order and contained no seed particles.

In some embodiments, the particulate carbon in the cathode and/or the anode contains doped carbon materials (e.g., carbon doped with H, O, N, S, Li, Cl, F, Si, Se, Sb, Sn, Ga, As, and/or other metals), undoped carbon materials, or combinations thereof. Doped carbon can also include carbon with a matrix allotrope doped with carbon atoms (not in the matrix structure) and/or doped with other types of carbon allotropes. Doped carbon materials can also be doped with functional groups, such as amine ($NH_3$) groups. In some embodiments, doped carbon materials are formed using a dopant material, where the dopant material is introduced within a gas, liquid, or colloidal dispersion and fed into a reactor that is used to produce the doped particulate carbon. For example, dopant materials can be combined with a hydrocarbon precursor material and cracked in a reactor (e.g., a microwave plasma reactor or a thermal reactor) to produce a doped particulate carbon.

In some embodiments, the particulate carbon in the cathode and/or the anode contains nano-mixed particulate carbon. In some embodiments, the surface area, structure, and/or surface activity of the present particulate carbon materials are tuned by nano-mixing the carbon particles within the carbon materials with particles of other materials. In some embodiments, particles of nano-mix additive materials can be beneficially integrated with particles of the graphene-based carbon on a particle level, which shall be referred to as nano-mixing in this disclosure. The average diameter of the particles of the nano-mix additive material and the graphene-based carbon materials in the nano-mixed particulate carbon can be from 1 nm to 1 micron, or from 1 nm to 500 nm, or from 1 nm to 100 nm, or can be as small as 0.1 nm. In some embodiments, the nano-mix additive material and the graphene-based carbon material are chemically bound, or are physically bound, together in the nano-mixed particulate carbon. In some embodiments, the nano-mixing involves introducing nano-mix additives during particulate formation (e.g., during a hydrocarbon cracking process in a microwave plasma reactor or in a thermal reactor) such that the nano-mix additive material is integrated into the graphene-based carbon material as the carbon material is produced, rather than combining a carbon raw material with an additive in a later process as in certain conventional methods. In some embodiments, the nano-mix additive material can be introduced as a gas, liquid, or colloidal dispersion into a reactor that is used to produce the nano-mixed particulate carbon. As an example, silicon can be input into a reactor along with a hydrocarbon process gas (or other carbon-containing process material such as a liquid alcohol) to produce silicon nano-mixed with graphene, graphene-based carbon materials, and/or other carbon allotropes. In other examples, the resulting nano-mixed particulate carbon of the present embodiments can contain particles of O, S, $Li_xSy$ (where x=0-2 and y=1-8), Si, $Li_{22}Si_5$, $Li_{22-x}Si_{5-y}$ (where x=0-21.9, and y=1-4.9), and $Li_{22-x}Si_{5-y-z}Mz$ (where x=0-21.9, y=1-4.9, z=1-4.9. and M is S, Se, Sb, Sn, Ga, or As), and/or other metals.

In some embodiments, the particulate carbon to be used in the cathode and/or the anode are produced and collected, and no post-processing is done. In other embodiments, the particulate carbon to be used in the cathode and/or the anode are produced and collected, and some post-processing is done. Some examples of post-processing include mechanical processing, such as ball milling, grinding, attrition milling, micro-fluidizing, jet milling, and other techniques to reduce the particle size without damaging the carbon allotropes contained within. Some examples of post-processing include exfoliation processes such as shear mixing, chemical etching, oxidizing (e.g., Hummer method), thermal annealing, doping by adding elements during annealing (e.g., O, S, Li, Si, Se, Sb, Sn, Ga, As, and/or other metals), steaming, filtering, and lyophilizing, among others. Some examples of post-processing include sintering processes such as SPS (Spark Plasma Sintering, i.e., Direct Current Sintering), Microwave, and UV (Ultra-Violet), which can be conducted at high pressure and temperature in an inert gas. In some embodiments, multiple post-processing methods can be used together or in series. In some embodiments, the post-processing will produce functionalized carbon nanoparticles or aggregates described herein.

Substrates for Lithium Ion Batteries

In some cases, the present cathode and/or anode materials are arranged on a dense or porous substrate and can contain any electrically conductive material. Some non-limiting examples of electrically conductive materials that can be included in the present substrates are metal foil (e.g., Ti foil, Ti alloy foil, stainless steel foil, Cu foil, Cu alloy foil, or other metallic foil), carbon paper, metal particles, oxide particles, carbon particles, carbon foam, and/or metal foam. In some embodiments, the substrate of the electrodes (i.e., the anodes and/or cathodes) for lithium ion (e.g., Li/S) batteries contains carbon paper, carbon fibers, carbon nanofibers, carbon cloth (e.g., woven carbon fiber cloth), particulate carbon, or combinations thereof.

The substrates can contain a single layer, multiple layers, an interpenetrating network of conductive and non-conductive materials, and/or conductive porous or solid films or coatings on non-conductive base materials, each of which can include one or more of the electrically conductive materials listed above. For example, a substrate can be formed from a metal foil coated with a porous layer containing conductive carbon allotropes (e.g., graphene). Another example of a substrate material is an interpenetrating network of carbon allotropes and non-conductive polymer.

In some embodiments, the substrates can be carbon substrates that contain carbon materials that have high electrical conductivity (e.g., greater than 500 S/m, or greater than 1000 S/m), and/or high surface area (e.g., with surface area greater than 10 m2/g, or greater than 50 m2/g, when measured using a Brunauer-Emmett-Teller (BET) method with nitrogen as the adsorbate).

In some embodiments, the substrate can contain carbon paper. In some embodiments, the carbon paper contains carbon fibers formed from a mixture of a particulate carbon (e.g., a particulate carbon described herein) and a polymer base material. The carbon fibers may be formed by, for example, by electrospinning. The polymer base material for the carbon paper can be, for example, polyacrylnitrile (PAN), polyaniline (PAni) or polythiophene (PTH), and may also include a co-polymer such as polyethylene oxide (PEO) or polyvinyl alcohol (PVA). In some embodiments, the carbon paper can contain an active electrode material (e.g., sulfur or silicon).

In some embodiments, the substrates for the cathode and/or anode contain mixed allotrope carbon-based materials, such as electrically conductive carbon fiber mats that incorporate carbon fibers with more than one allotrope of carbon (e.g., a partially ordered carbon and graphene, or amorphous carbon and graphene). In some embodiments, the carbon fibers of the mat comprise a matrix of a first carbon allotrope (e.g., amorphous or partially ordered carbon), and a second carbon allotrope that is highly ordered (e.g., graphene or fullerenes). In some embodiments, the highly ordered second allotrope of carbon contains unique carbon materials, such the particulate carbon materials described herein, or fullerenes and/or connected fullerenes with properties that are improved over conventional carbon materials (e.g., improved atomic order, surface area, purity and/or electrical conductivity). In some embodiments, ordered or highly ordered carbon allotropes are carbon materials with a specific crystal structure (e.g., a crystal structure with hexagonally arranged carbon atoms in the case of graphene), and a low concentration of atomic defects (e.g., as measured by Raman spectroscopy).

Additional embodiments of substrates that can be used in the present batteries (including the mixed allotrope carbon fiber mats above) are described in U.S. patent application Ser. No. 15/905,157, entitled "Mixed Allotrope Particulate Carbon Films and Carbon Fiber Mats," which is assigned to the same assignee as the present application, and is incorporated herein by reference as if fully set forth herein for all purposes.

In some embodiments, the substrate is a carbon foam or a carbon paper that contains a further conductive additive and/or a non-conductive redox mediator additive. In some embodiments, the redox mediator additive has a binding effect and is tethered to the carbon foam or carbon paper, and/or tethers polysulfides to the cathode.

In some embodiments, the substrate is a carbon foam or carbon paper and contains a further metallic or non-metallic conductive substrate. In some embodiments, the carbon foam or carbon paper is bonded to, or deposited on, a metallic or non-metallic conductive substrate. In some embodiments, a metallic or non-metallic layer is deposited (e.g., by sputtering) onto the carbon foam or carbon paper. The metallic or non-metallic substrates described above can be porous or non-porous in different embodiments.

In some embodiments, the substrate is a carbon foam or carbon paper that includes carbon fibers made from polymer/carbon composites (e.g., ordered carbon particles mixed with PAN). In some cases, the polymer/carbon composites contain the particulate carbon materials described herein, graphene, graphene oxide, carbon nano-onions, graphite, and/or amorphous carbon. These types of carbon fibers can be formed using electrospinning, or other fiber spinning processes.

Additionally, metallic foams or wire meshes can be used for the substrates for the electrodes (i.e., the anodes and cathodes) for Li/S or Li-ion batteries. Some examples of metallic foams that can be used as substrates are Ni foams, Cu foams and Al foams. Some examples of wire meshes that can be used as a substrate are Ni wire mesh, Cu wire mesh and Al wire mesh.

In some embodiments, the present substrates include particulate carbon with a mesoporous structure and the active cathode or anode materials are contained within the pores of the mesoporous substrate components. For similar reasons as described above, this structure can be beneficial to battery properties such as capacity and/or stability by providing high surface areas, small pores, and low resistance pathways from a current collector to the active materials.

In some embodiments, the substrates contain doped particulate carbon (e.g., a sulfur-doped carbon, such as sulfur-doped CNOs).

Electrolytes for Lithium Ion Batteries

The electrolyte can contain one or more solvents, a lithium salt, and optionally a redox additive. In some cases, 1, 2, 3, or 4 solvents are used in the electrolyte. Some examples of solvents that can be used in the electrolyte are non-aqueous solvents (e.g., fluorinated solvents, vinyl solvents such as fluorinated ethers, and fluorinated dioxanes). Some examples of lithium salts that can be used in the electrolyte are lithium bis(fluorosulfonyl)imide (LiFSI), bis(trifluoromethane)sulfonimide lithium salt (LiTFSI), and others. In addition to use in lithium ion batteries, the electrolytes in this section can be used for other types of next generation secondary batteries including those where Na ions, Mg ions, or K ions replace the Li ions.

In some embodiments, the redox additive can include one or more metallocenes. For example, the metallocene can contain a transition metal (e.g., a first d-block series transition metal, a second d-block series transition metal, and/or a third d-block series transition metal). Some examples of transition metals that can be in the redox additive are iron, ruthenium, osmium, rhodium, rhenium, iridium, and combinations thereof. In some cases, the metallocene can contain organic ligands. In some cases, these organic ligands can be electron donating and electron withdrawing group substituted N,N' ligands. Some examples of organic ligands that can be included in the redox additives are cyclopentadienyl, pentamethylcyclopentadienyl, 2,2'-bipyridine (bpy), or combinations thereof. In different embodiments, the concentration of the redox additive in the electrolyte is from 5 mM to 0.5 M. Some examples of redox additives are bis(cyclopentadienyl)ruthenium, bis(pentamethylcyclopentadienyl)ruthenium(II), ruthenium $(Bpy)_3$ $PF_6$, and bis(cyclopentadienyl)osmenium.

In some embodiments, the electrolyte is soaked into a separator composed of a porous carbon-based polymeric material. Some non-limiting examples of polymers used in separators are polypropylene, poly-vinylidene fluoride and polyethylene or a mixture of said polymeric materials. Alternatively, the separator can be a gel or solid in the case of solid-state separators. In some cases, solid-state separators can be produced by printing. Alternatively, the separator can be a polymer mat containing Nafion or other polysulfide repelling agent and/or binding agent, and include a redox mediator as defined above. Polymer mat separators can be produced by techniques such as extrusion, spinning, weaving, electrospinning, or casting. The binding agent, repelling agent, and/or redox mediator in separators (e.g., polymer mat separators) can act to retain the polysulfides near the cathode surface, mitigating migration thereof either by acting as a chemical repulsing, charge-based repelling agent or steric hindrance to polysulfide diffusion and/or migration away from the cathode through the separator or to the anode surface. Additionally, the particulate carbons described herein can be incorporated into the separators to further reduce polysulfide migration. Furthermore, the particulates incorporated into the separator can be comprised of a variety of particles (e.g., non-conductive oxides, doped oxides, nitrides, carbides) dispersed within the polymeric separator. The particles could also include other redox agents, such as the metallocenes discussed elsewhere in this disclosure. The particles incorporated into the separators could be of a variety of morphologies including nanoparticles, nanowires, and nanorods.

Combinations with Conventional Battery Materials

In some embodiments, the cathodes, anodes, carbon substrates, and electrolytes described above can be utilized in lithium ion batteries (e.g., Li/S or Li-ion) in combination with conventional battery components. For example, a Li-ion battery can be constructed using the cathodes described herein and a conventional lithium ion anode material (e.g. Li, Si, graphite, C, etc.) using associated conventional manufacturing processes and materials. In another example, a Li-ion battery can be constructed using the anodes described herein with a conventional lithium ion cathode material (e.g., LCO, NCA, NMC, LFP, S, etc.) using the associated conventional manufacturing processes and materials. In another example, a Li-ion battery can be constructed using the electrodes described herein with a conventional lithium ion type electrolyte (e.g., containing lithium salts such as $LiPF_6$, LiTFSI, LiFSI, etc., and solvents such as ethylene carbonate (EC), dimethyl carbonate (DMC), fluoroethylene carbonate (FEC), dioxolane (DOL), dimethoxyethane (DME), dioxane (DX), acetonitrile, etc.).

Lithium Ion Battery Performance

Figures 2A, 2B:
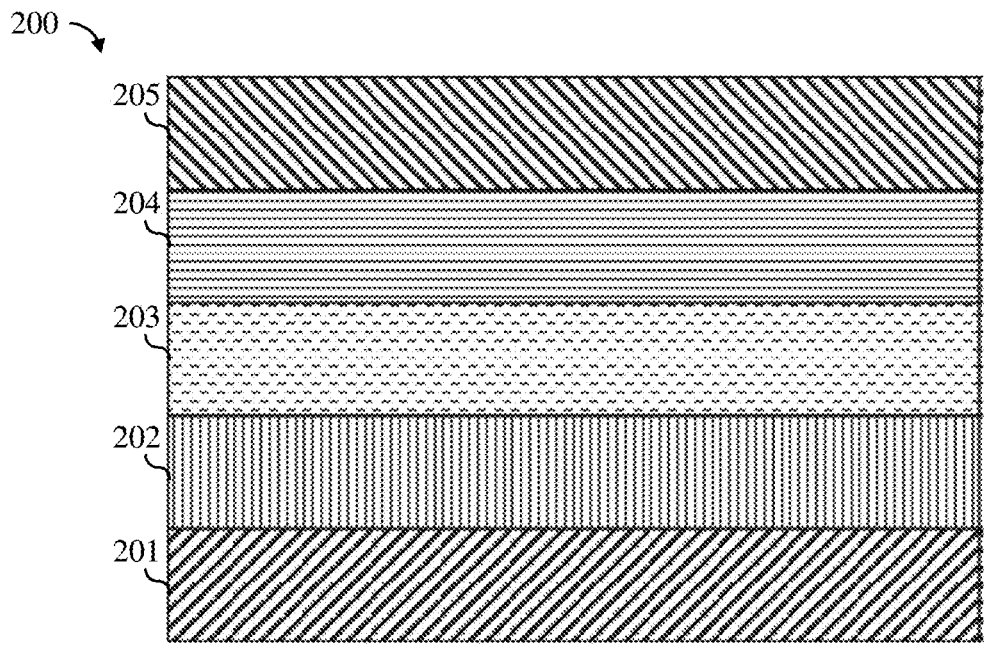
FIG. 2A is an example of a lithium ion battery, in accordance with some embodiments.
FIG. 2B shows the theoretical and practical capacities for lithium ion battery (Li/S battery) electrodes and batteries, in accordance with some embodiments.

FIG. 2A shows an example of a lithium ion battery 200, in accordance with some embodiments described herein. In this example, a cathode 202 is arranged on a substrate 201, and an anode 204 is arranged on a substrate 205. The electrolyte 203, optionally including a separator, is arranged in between the cathode and anode electrodes to form the battery. In different embodiments, the substrates 201 and 205, the cathode 202, the anode 204, and the electrolyte 203 can contain any of the materials described above.

FIG. 2B shows the theoretical and practical capacities for lithium ion battery (Li/S battery) electrodes and batteries containing non-limiting examples of different anode and cathode materials. FIG. 2B shows the promise of the present silicon-based anodes ($Li_{22-x}S_{5-y}$ or elemental Si in this example) compared to other conventional anode compounds (Li and C6) for improving the capacity of the anodes in lithium ion batteries. FIG. 2B also shows the promise of the present sulfur cathodes (elemental S or $Li_2S$ in this example) compared to conventional cathode materials (LCO and NMC) for improving the capacity of the cathodes in lithium ion batteries. FIG. 2B also gives a non-limiting example of a full cell using $Li_2S$ cathodes and $Li_{22-x}S_{5-y}$ or elemental Si anodes compared to a conventional cell having an NMC cathode and LiC6 anode, where the practical battery specific energy (in units of Wh/kg, where the mass in kg refers to the mass of the entire integrated battery including packaging) has been improved from 160 Wh/kg to greater than 345 Wh/kg or greater than 600 Wh/kg, respectively. In some embodiments described herein, the capacity of a lithium ion battery is greater than 300 Wh/kg, or greater than 400 Wh/kg, greater than 500 Wh/kg, or greater than 600 Wh/kg, or greater than 800 Wh/kg, or greater than 1000 Wh/kg. In some embodiments described herein, the capacity of a lithium ion battery can be improved 2×, 3×, 4×, 5×, or greater than 5× compared to conventional lithium ion batteries.

Figure 3:
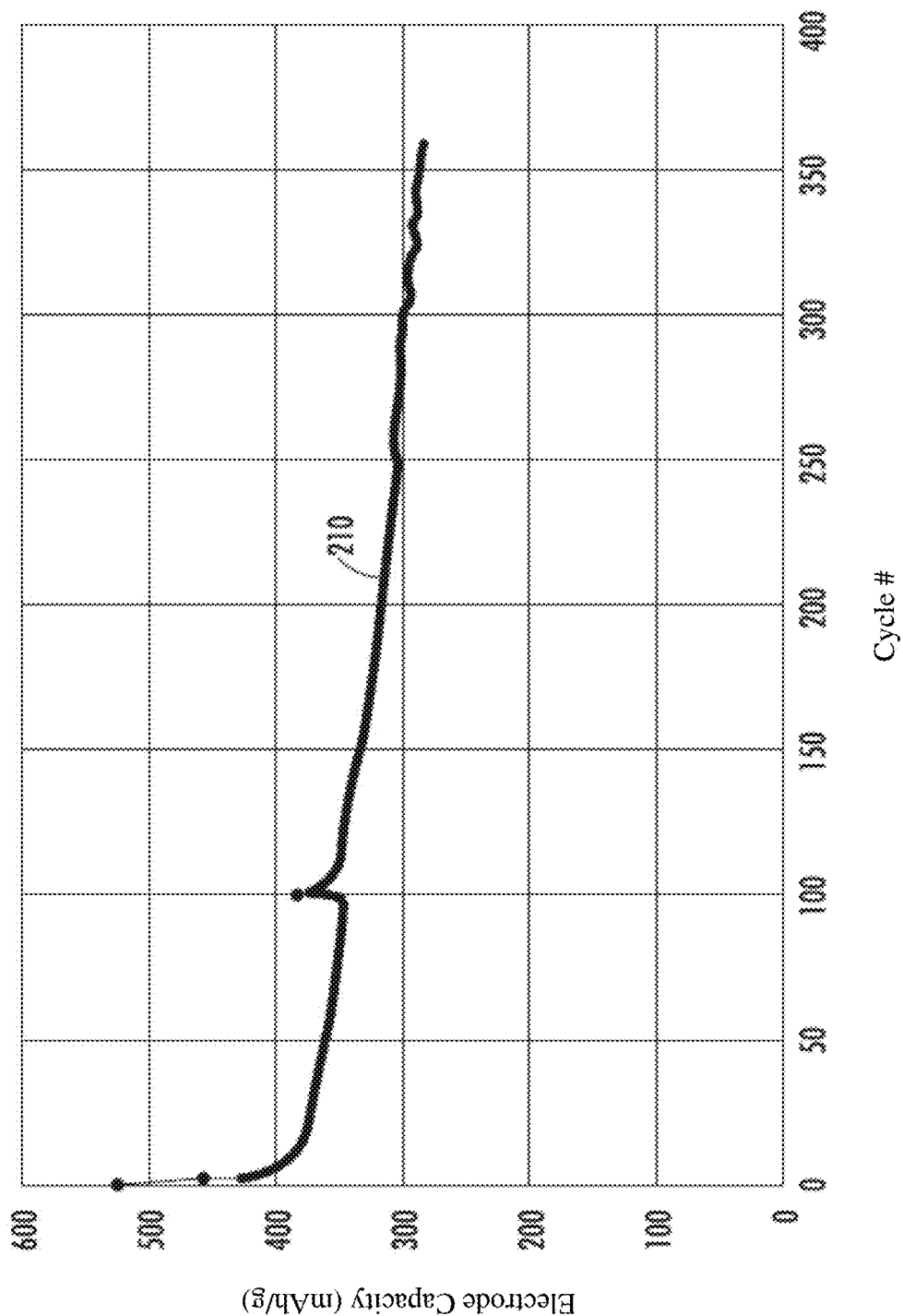
FIG. 3 shows an experimental example of the capacity of a sulfur-based cathode, in accordance with some embodiments.

FIG. 3 shows an experimental example of the capacity of the sulfur-based cathodes described herein, over about 350 charge/discharge cycles. In this example, the cathode contained $Li_2S$ active material, and particulate carbon in a mass ratio of 2:1. The anode was elemental Li, and the electrolyte was a mixture of lithium bis(fluoromethane)sulfonimide, in a 1:1 volume ratio of DOL:DME solvent with a ferrocene redox mediator. The current collector for the cathode was carbon paper, and the current collector for the anode was copper foil. The particulate carbon in this example was produced using a microwave reactor as described in the aforementioned U.S. patents." The y-axis for the capacity curve 210 is in the units of mAh per gram of total cathode (not per gram of sulfur). The sulfur cathode shown in curve 210, for example, has a capacity of about 300 mAh per gram of cathode material over about 300 cycles, about 2× that of a conventional metal oxide cathode in a lithium ion battery. The results shown in FIG. 3 demonstrate that in some embodiments, the capacity of the present cathodes are greater than 300 mAh, or greater than 400 mAh, or greater than 500 mAh, or from 300 to 600 mAh per gram of cathode. However, the processing conditions for the cathodes in this example were not optimized, and these results also indicate that upon further process optimization the capacity of the present cathodes can be greater than 400 mAh, or greater than 600 mAh, or greater than 800 mAh, or greater than 1000 mAh, or from 400 mAh to 1200 mAh per gram of cathode after 100 cycles, or after 200 cycles, or after 300 cycles, or after more than 300 cycles.

In some embodiments, the present cathodes have high capacities, such as those shown in FIG. 3, and the high capacity is maintained at fast discharge rates. For example, the discharge rate for a sulfur cathode described herein can be about 500 mAh per gram of cathode at slow discharge rates (e.g., C/18 and C/10 rates, where the total capacity C is discharged in 18 and 10 hours respectively), and can be reduced only slightly to about 400 mAh per gram of cathode at a rate that was about 10× faster (e.g., 1C rate, where the total capacity C is discharged in 1 hour). In some embodiments, the reduction in capacity of a sulfur-based cathode is from 2% to 10% between a rate of C/10 to C/2.

Figure 4A:
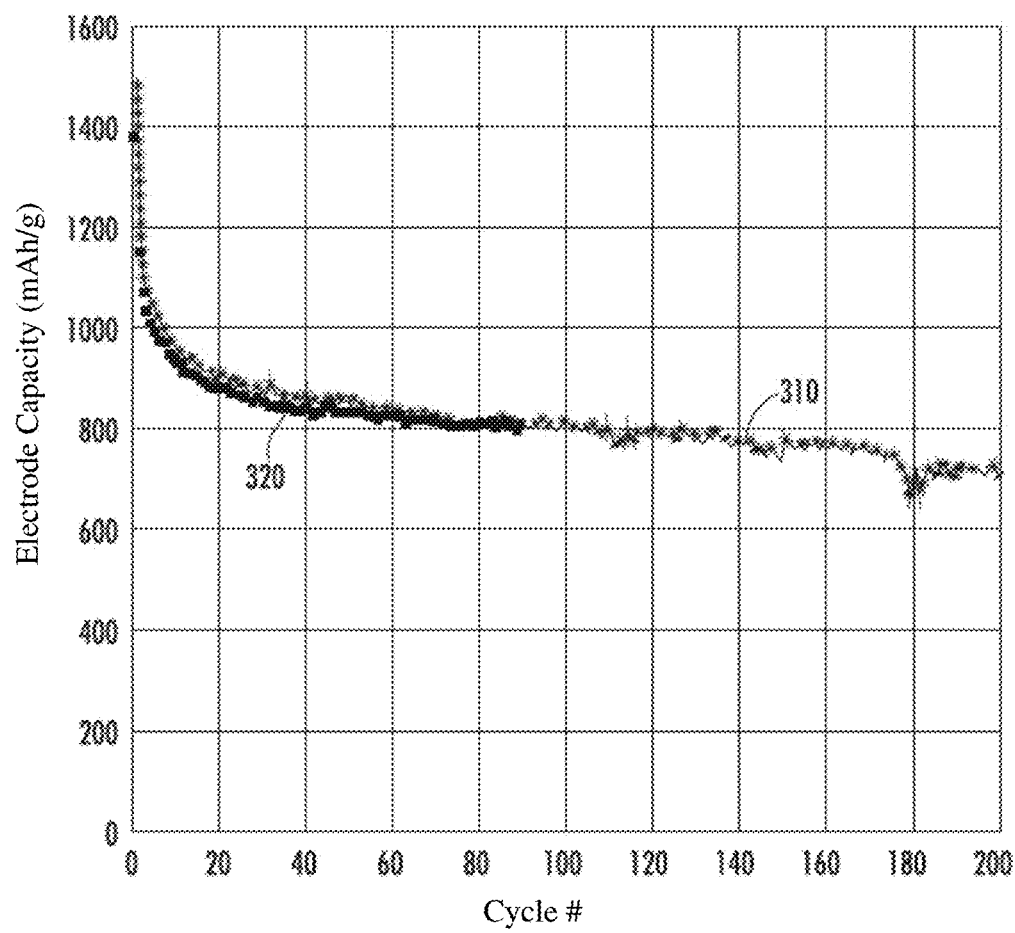
FIGS. 4A and 4B show example capacities of two different embodiments of silicon-based anodes, in accordance with some embodiments.
Figure 4B:
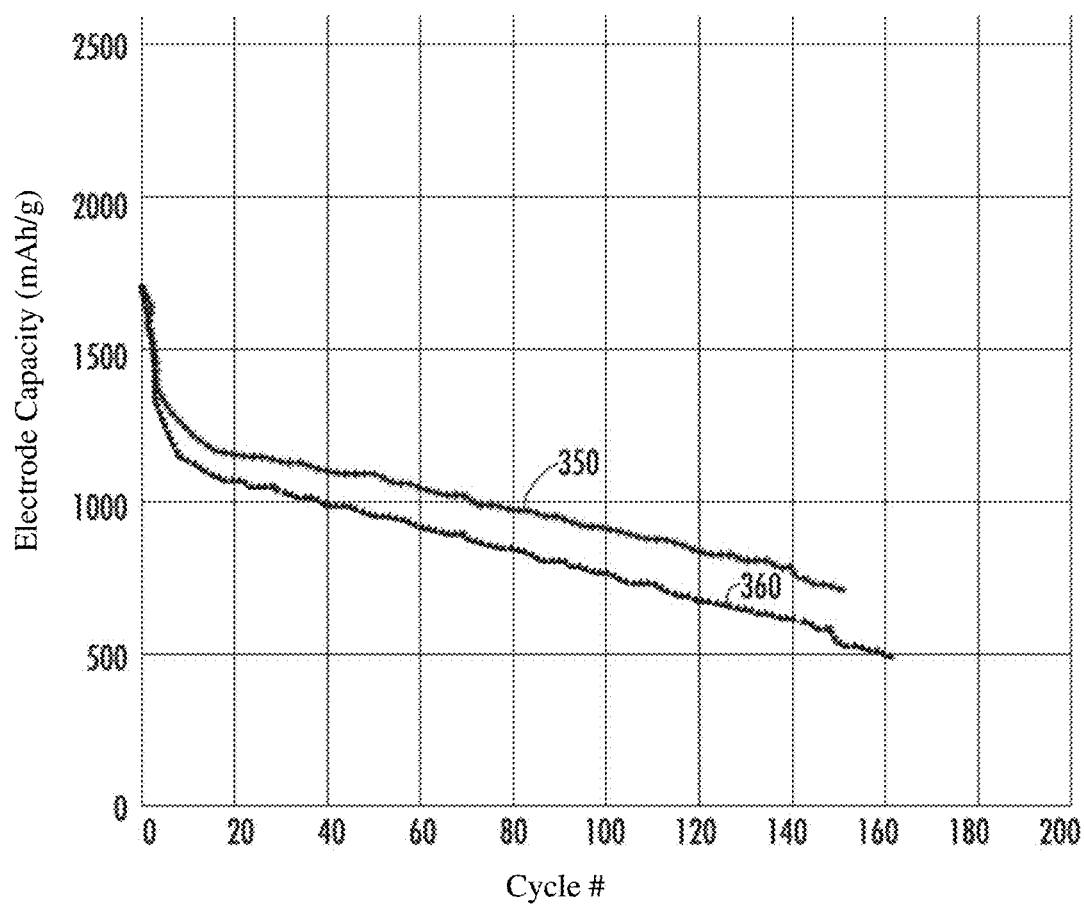

FIGS. 4A and 4B show example capacities of two different embodiments of silicon-based anodes described herein, in different example embodiments over about 100 to 200 charge/discharge cycles. The anodes whose capacities are plotted in FIG. 4A contain particulate LiSi active material and particulate carbon in a mass ratio of 60:40. The anodes whose capacities are plotted in FIG. 4B contain 60% by mass particulate Si active material, 20% by mass PAN binder, 19% by mass S-doped particulate carbon, and 1% by mass graphene oxide. The particulate carbon and S-doped particulate carbon in both of these examples were produced using a microwave reactor as described in the aforementioned U.S. patents." The cathode in these examples was elemental Li foil, and the electrolyte was a mixture of lithium bis(fluoromethane)sulfonimide, in a 1:1 volume ratio of DOL:DME solvent with a ferrocene redox mediator. The current collector for the cathode in these examples was lithium foil, and the current collector for the anodes was carbon paper. The y-axis for the capacity curves in FIGS. 4A and 4B is in the units of mAh per gram to total anode (not per gram of silicon). The LiSi anodes shown in curves 310 and 320 in FIG. 4A, for example, have capacities of about 800 mAh per gram of anode material over more than 100 cycles, which is more than 2× that of a conventional graphite anode in a lithium ion battery. The Si anode capacities are shown in curves 350 and 360. These anodes have capacities of about 750 mAh and 900 mAh per gram of anode material over more than 100 cycles, which is more than 2× or about 3× that of a conventional graphite anode in a lithium ion battery. The results shown in FIGS. 4A and 4B demonstrate that in some embodiments, the capacity of the present anodes are greater than 500 mAh, or greater than 750 mAh, or greater than 900 mAh, or from 500 mAh to 1100 mAh per gram of anode after 100 cycles. However, the processing conditions for the anodes in this example were not optimized, and these results also indicate that upon further process optimization the capacity of the present cathodes can be greater than 1000 mAh, or greater than 1500 mAh, or greater than 2000 mAh, or greater than 3000 mAh, or from 1000 mAh to 3500 mAh per gram of anode after 100 cycles, or after 200 cycles, or after 300 cycles, or after more than 300 cycles.

In some embodiments, the present anodes have high capacities, such as those shown in FIGS. 4A and 4B, and the high capacity is maintained at fast discharge rates. For example, the discharge rate for an example of a silicon-based anode described herein can be about 5× slower for a C/10 rate (where the total capacity C is discharged in 10 hours) compared to a C/2 rate (where the total capacity C measured at a low rate is discharged in 2 hours). In some embodiments, the reduction in capacity of a silicon-based anode is from 2% to 10% between a rate of C/10 to C/2.

Figure 5:
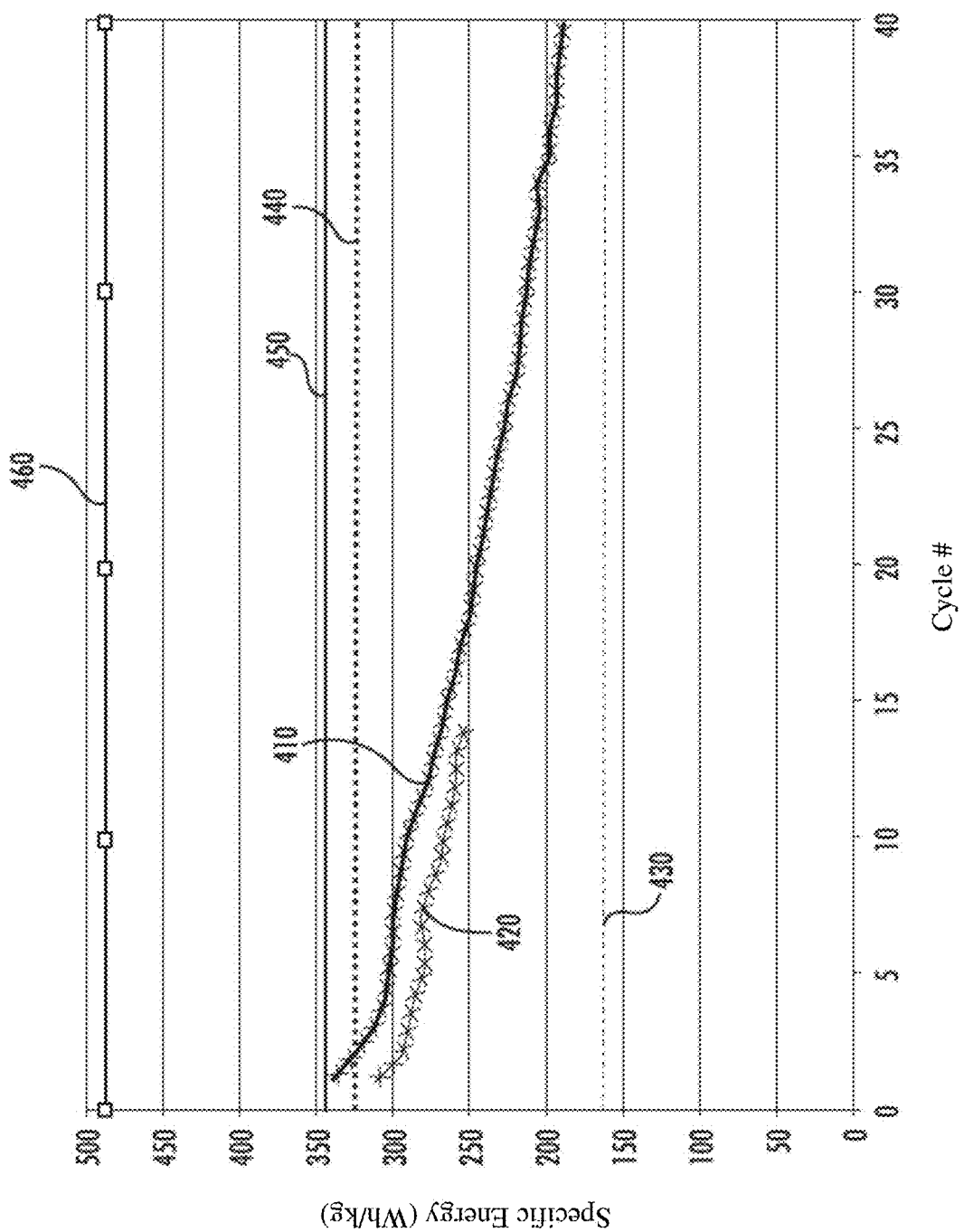
FIG. 5 shows example performance of two examples of lithium ion batteries, in accordance with some embodiments.

FIG. 5 shows example performance of two examples of present lithium ion batteries (i.e., cells) over about 40 charge/discharge cycles. The specific energy of the cells 410 and 420 are plotted in FIG. 5 in the units of Wh/kg (where the mass in kg refers to the mass of the entire integrated battery including packaging). The specific energy of a conventional lithium ion battery (i.e., containing a metal oxide cathode and a graphite anode) is shown in 430, and 2× the specific energy of a conventional lithium ion battery is shown in 440. The cells in this example included anodes containing particulate LiSi active material and a PAN binder in a mass ration of 0.75:1. The cells in this example included cathodes containing $Li_2S$ active material and particulate carbon in a mass ratio of 2:1. The cells in this example also included electrolytes containing LiFSI and a 1:2 ratio by volume DX:DME solvent with polysulfide additions. The current collectors for the anodes were copper foil, and the current collectors for the cathodes were aluminum foil. The cells in this example displayed initial specific energies from 300 Wh/kg to 350 Wh/kg, which is about 2× the specific energy of a conventional lithium ion battery. The curve 450 shows an example of a specific energy of a present cell, in some embodiments. The results shown in FIG. 5 demonstrate that in some embodiments, the specific energy of the present cells is greater than 200 Wh/kg, or greater than 250 Wh/kg, or greater than 300 Wh/kg, or from 200 Wh/kg to 350 Wh/kg after 10, 20, 30 or 40 cycles. However, the processing conditions for the cells in this example were not optimized, and these results also indicate that upon further process optimization the specific energy of the present cells can be greater than 350 Wh/kg, or greater than 400 Wh/kg, or greater than 450 Wh/kg, or greater than 500 Wh/kg, or from 300 Wh/kg to 600 Wh/kg after 10, 20, 30, 40, or more than 40 cycles.

In some embodiments, the specific energy is about 500 Wh/kg, and the energy density is about 500 Wh/L (where the volume in L refers to the volume of the entire battery including packaging). In some embodiments, the energy density of a lithium ion battery is greater than 300 Wh/L, or greater than 400 Wh/L, greater than 500 Wh/L, or greater than 600 Wh/L, or greater than 800 Wh/L, or greater than 1000 Wh/L, or from 300 to 1200 Wh/L.

Methods to Produce Lithium Ion Batteries

Figure 6:
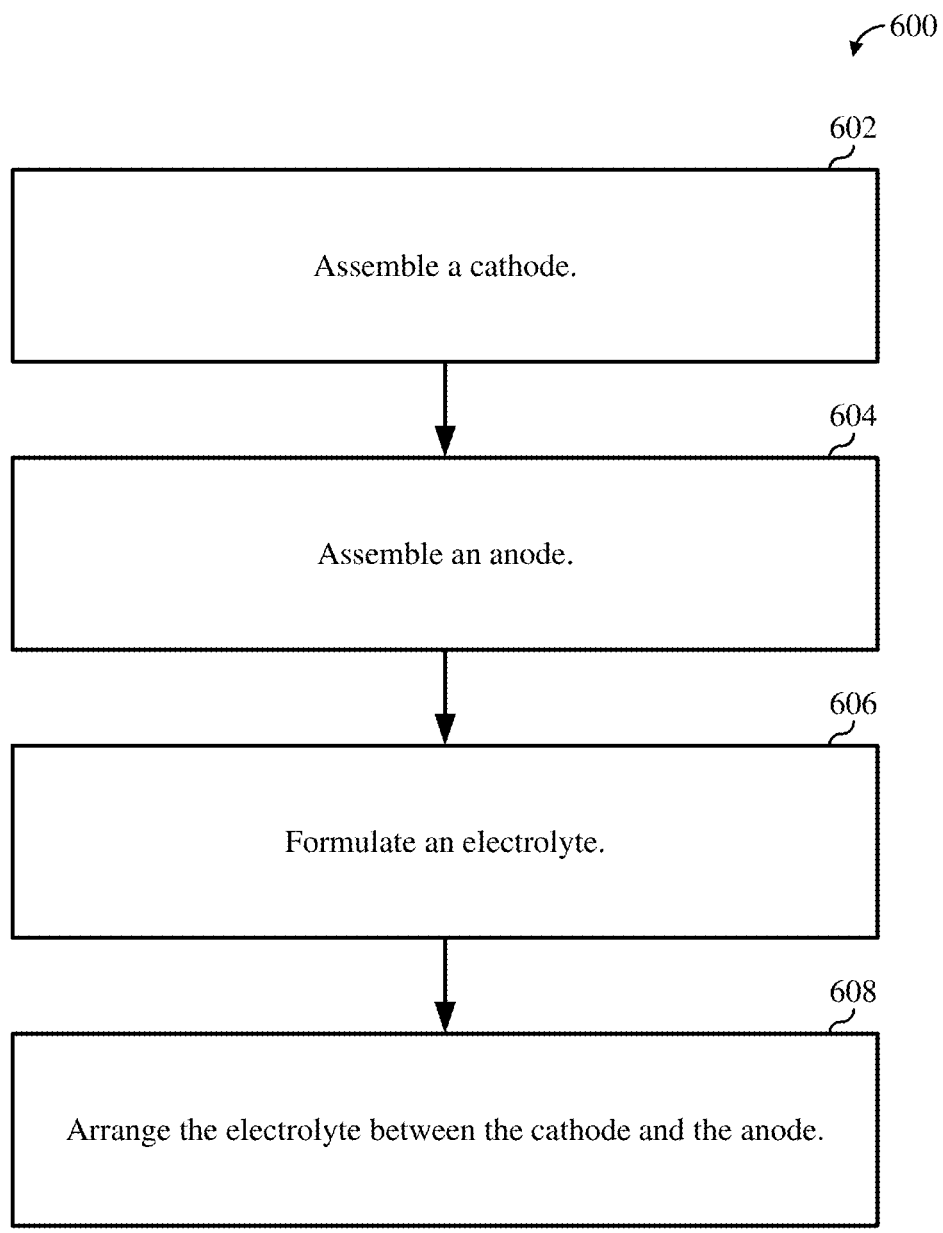
FIG. 6 shows an example flowchart of a method to produce a lithium ion battery, in accordance with some embodiments.

FIG. 6 shows an example of a method 600 to produce a lithium ion battery, in accordance with some embodiments. In this example, a method to produce a lithium ion battery comprises assembling a cathode 610, assembling an anode 620, formulating an electrolyte 630, optionally providing a separator containing the electrolyte (not shown), and arranging the electrolyte and the optional separator between the anode and the cathode 640.

In some embodiments of the method above, assembling the cathode 610 comprises the steps of: providing a substrate such as carbon fiber paper or metal foil; formulating a slurry comprising S, $Li_2S$, NCM, LFP, a first particulate carbon, and optionally a binder; and pressing the slurry into or on the substrate.

In some embodiments of the method above, assembling the anode 620 comprises the steps of: providing a substrate such as carbon fiber paper or metal foil; formulating a slurry comprising silicon or LiSi particles, a second particulate carbon, graphene oxide (or other oxygen source), a polymer, and a first solvent; and pressing the slurry into or on the substrate.

In some embodiments, the cathodes are formed from a cathode slurry containing a sulfur material (e.g., elemental S and/or $Li_2S$), one or more particulate carbons, optionally a conventional lithium ion cathode material, optionally one or more polymeric materials, optionally one or more binders, and one or more solvents. Some examples of solvents that can be included in the cathode slurry are acetonitrile, N-Methyl-2-pyrrolidone (NMP), diglyme, dimethoxyethane (DME), septane, hexane, benzene, toluene, dichloromethane, ethanol and variants of the same. Some examples of conventional lithium ion cathode materials include NCM, LFP, lithium cobalt (LCO), and nickel cobalt aluminum (NCA).

In some embodiments, the anodes are deposited from an anode slurry. In some cases, the anode slurry can be coated and dried on (or pressed onto or pressed into) the anode substrate to form the anode. In some embodiments, the anode slurry contains silicon material (e.g., elemental Si, LiSi, silicon doped CNOs), one or more particulate carbons, one or more solvents, optionally graphene oxide, optionally one or more polymeric materials, and optionally one or more binders. Some examples of solvents that can be used in the anode slurry are dimethylformamide (DMF), diglyme, tetraethylene glycol dimethyl ether (TEGDME), polyethylene glycol dimethyl ether (PEGDME), water, N-Methyl-2-pyrrolidone (NMP), variants of the same, and other solvents compatible with the Si-based anodes used.

In some cases, cathodes can be produced using other solution-based methods. For example, $Li_2S$ active cathode material can be dissolved in a solvent, the solvent mixture can be coated on a substrate, and upon drying the $Li_2S$ can precipitates to form the $Li_2$—S particles in the cathode.

In some embodiments of the method above, formulating the electrolyte 630 comprises the steps of: providing a second solvent, a lithium salt, and a redox additive comprising a metallocene; and combining the second solvent, lithium salt and redox additive.

In other embodiments, reactors are used in the formation of the particulate carbon, for example by cracking gas, liquid and/or colloidal dispersion precursors. In some cases, the reactors used to create the particulate carbon are configured to deposit the created particles directly onto a substrate (e.g., a moving substrate in a drum coater type configuration). Such methods can be advantageous since the slurry process can be eliminated, which simplifies manufacturing. In some embodiments, the unique microwave plasma reactors described herein are used to produce the particulate carbon materials described herein and films composed of various carbon allotropes and/or numerous other elements and compounds in isolation or in combination.

In some embodiments, plasma spray methods are used to produce the anode and/or cathode structures of the present lithium ion batteries.

In some embodiments, a plasma spray method comprises supplying a plurality of input particles (e.g., particulate carbon, doped particulate carbon, or nano-mixed particulate carbon) and generating a plurality of ionic species from a target material (e.g., an active cathode or anode material), wherein the ionic species form coatings on the input particles, to form a plurality of coated particles (e.g., mesoporous particulate carbon with active cathode or anode material deposited within the pores). The plurality of coated particles is then ionized to form a plurality of ionized particles and a plasma jet comprising the plurality of ionized particles is generated. The plurality of ionized particles are then accelerated to form a plasma spray comprising the ionized particles in a third stage. In some embodiments, the plurality of accelerated ionized particles are then directed to a substrate and form a coating on the substrate.

In some embodiments, of any of the above methods, the substrate for the anode and/or cathode can contain a carbon paper. In any of the above methods, the carbon paper can be a carbon fiber paper formed from a mixture of a carbon particle material and a polymer base material. The carbon fibers may be formed by, for example, by electrospinning. The carbon particles may be, but are not limited to, graphene, carbon nano-onions and/or other carbon particles created by thermal or microwave cracking. In some embodiments, the active material—that is, the sulfur or silicon material or composites for the cathode or anode, respectively—may be incorporated into the carbon paper during manufacturing of the carbon paper.

Lithium Ion Batteries and Battery Materials Containing Carbon Meta Particles

Conventional lithium ion batteries have limitations, such as low energy density and poor cycle lifetime and/or stability. The inferior performance of conventional lithium ion batteries is in part due to the insulating and micromechanically and chemically unstable nature of the electroactive materials in conventional lithium ion batteries (e.g., when in contact with conventional liquid lithium ion containing electrolytes). One approach to addressing the aforementioned limitations involves carbon meta particles in combination with electroactive materials.

As such, described in the following embodiments are lithium ion batteries containing carbon meta particles and electroactive materials, such as silicon and sulfur with theoretical specific capacities of 4199 mAh/g and 1672 mAh/g respectively, with higher specific capacity than conventional electroactive battery materials. The term "carbon meta particles" as used herein refers to mesoporous carbon particles with wide distributions of pore sizes (e.g., multi-modal distributions, or comprising pores with sizes from 0.1 nm to 10 nm and pores with sizes from 10 nm to 100 nm). Carbon meta particles can have improved characteristics compared to conventional carbon particles (e.g., higher surface area and electrical conductivity), as described above, and can be used in several components of lithium ion batteries (e.g., anodes, cathodes, and current collectors). In some embodiments carbon meta particles can also include materials other than carbon, such as electroactive materials, alkali metals, oxide materials, and/or impurities (e.g., hydrogen, and small quantities, e.g., less than 1%, of other elements such as oxygen and/or metals). Improved matched silicon/carbon anode and sulfur/carbon cathode electrodes for lithium ion batteries are also described, in which matched silicon/carbon anode and sulfur/carbon cathode electrodes exhibit improved stability and/or cycle lifetime compared to conventional lithium ion batteries. Additionally, in some embodiments, these electrodes are formulated into integrated full silicon-sulfur cells. In some embodiments, these integrated cells (i.e., batteries) are cells in a pouch type configuration.

In some embodiments, the electrode architectures containing carbon meta particles are also inherently stable during lithiation/de-lithiation and reliably manufacturable at a large scale.

There are many applications for lithium ion batteries with high specific capacity that are stable over many cycles. For example, satellites and other space technologies (e.g., technologies for space-based communications) require reliable power and energy storage and hence, improvements in energy density and stability (i.e., safety and cycle lifetime) would be beneficial to those applications.

In some embodiments, the unique mesoporous carbon meta particles provide an enabling platform/architecture for rechargeable battery electrode construction with the potential for disruptive performance gains and cost reductions over existing lithium ion batteries. In some cases, the mesoporous carbon meta particles can be produced using a microwave reactor operating with atmospheric pressures. In some embodiments, the carbon meta particles contain 3D nanostructures at different length scales (e.g., ranging from nanometers to microns), or contain hierarchical 3D structures (e.g., fractal-type structures) at different length scales (e.g., ranging from nanometers to microns). The present carbon meta particles can improve battery performance and durability by improving the functionality of the core carbon framework in terms of electronic conductivity, mechanical durability, and specific capacity. Additionally, specific electroactive materials such as S, Si, F, Al, Ge, Sn, Sb, Fe, and combinations thereof can be incorporated into the mesoporous structures of the carbon meta particles (e.g., during particle fabrication, or electrode fabrication) to yield even greater capacity and stability (i.e., increased cycle lifetime with greater depth of discharge). In some embodiments, mesoporous carbon meta particles in combination with silicon and/or sulfur electroactive materials produce batteries with improved performance and safety metrics compared to the current state of the art batteries. In some embodiments, batteries with the aforementioned carbon meta particles and/or electroactive materials have specific capacities from 1,350 mAh/g to 1,800 mAh/g at 100,000 cycles.

In some conventional Li-ion battery designs, key electronic and ionic conductive pathways and triple phase boundary sites for fast redox reactions (with high exchange current densities) are created by mixing carbon and active material particles (with sizes, e.g., from 1-3 μm) and a binder into a slurry (e.g., N-Methyl-2-pyrrolidone (NMP) based), casting the slurry mixture onto a metal current collector (e.g., copper and aluminum for anode and cathode respectively), and then drying the slurry-coated collector. In conventional batteries, the ratio of active to inactive material is adjusted to optimize performance, and anode/cathode electrode thicknesses are adjusted to optimize capacity (matching lithium utilization/availability to each electrode). Conventional liquid electrolyte chemistries have been tailored to form 'quasi-stable' solid electrolyte interfaces (SEIs) at the active particle surface to reduce capacity fade and instability (as well as increasing the electrochemical window stability). However, the interface between the active particle and the liquid electrolyte is inherently unstable and over time, with the volume expansion/contraction associated with lithium intercalation/reaction, these 'quasi-stable' interfaces become more resistive partially due to increased SEI growth along with micromechanical fracturing of the SEI and parent active material. As a result, in conventional lithium ion batteries, the lithium ions are consumed by these processes as well as by other parasitic reactions.

The herein-disclosed batteries and battery materials overcome the inherent challenges and shortcomings (e.g., stability and lifetime) of conventional batteries (e.g., with mixed particle slurry construction). In some embodiments, the approach described herein utilizes unique, as-deposited carbon meta particles (e.g., 3D mesoporous meta particle formulations with carbon-based particles) as the electrical conducting backbone of a battery electrode. In some embodiments, specific active and functionalizing elements can be incorporated (e.g., doped and/or absorbed) into the engineered carbon meta particle nanostructures during the particle reaction/particle formation process (e.g., in a thermal or a microwave reactor). In other embodiments, post-processes such as mixing, milling, thermal processes, and/or plasma processes can also be utilized to selectively 'deposit' or incorporate electroactive nanoparticles and/or a polymer binder in (and around) the carbon scaffold, to create a meta particle with stable SEI. In some embodiments, the polymer binder serves both as the 'glue' and as a layer for reversible solid-state ionic transport/conduction. Reactor (and in some cases post-reactor) processing steps can be optimized to create carbon meta particles with 3D interconnected networks of electronically conducting ligaments (and/or segments) surrounded by open, porous cellular channels populated with pre-activated graphene fingers, electroactive materials, and/or open channels for liquid ion (i.e., lithium) conduction and/or shuttling. By controlling the 3D morphology of these materials (e.g., nanometer-scale pore sizes), the solubility and crystallinity of the lithium phase formation during battery operation can be optimized at the local micro- and meso-scales. In some embodiments, the as-fabricated carbon meta particle structure (with or without electroactive materials added) can be engineered to controllably adjust or relax 'in-situ' after early stage conditioning (lithiation/de-lithiation) to form a 'hardened', stable architecture with reversible, high energy storage and delivery (rate) performance.

In some embodiments, the present anode and/or cathode electrodes are produced by slurry casting of the engineered, carbon meta particles onto a conducting foil, such as aluminum or copper. In other embodiments, the reactors used in the formation of the carbon meta particles are configured to deposit the particles directly onto a moving substrate (e.g., in a drum coater type configuration) thereby eliminating the slurry process and enabling a more effective and efficient integrated electrode/current collector manufacturing process and/or design architecture. In some embodiments, unique microwave plasma reactors (e.g., as described above) produce carbon meta particles and thin/thick films (e.g., composed of various carbon allotropes as well as numerous other elements and compounds in isolation or in combination). By addressing a number of key challenges in conventional lithium ion battery manufacturing, such as particle handling and dispersion, the proposed carbon meta particle approach provides engineering and fabrication control at the nanometer scale for improved product reliability and performance (i.e., stability and energy/power density in the case of the battery).

In some embodiments, batteries contain the carbon meta particles described above in combination with conventional battery working (active) electrodes, such as elemental lithium metal and/or conventional $LiCoO_2$ (LCO) electrodes. In some designs, the conventional materials are used as counter electrodes (e.g., as anodes or opposite cathodes containing carbon meta particles, or as cathodes opposite anodes containing carbon meta particles).

Conventional battery materials can also be used in some embodiments in conjunction with the herein-disclosed carbon meta particles. For example, when conventional materials are used as counter materials along with the improved meta particles, they can assist with the effective optimization of lithium ion shuttle performance (i.e., reducing loss mechanisms and optimizing reversibility) in batteries using the disclosed carbon meta particles.

Anode and cathode electrodes for lithium ion batteries containing carbon meta particles, will now be described in accordance with some embodiments.

In some embodiments, carbon meta particles are produced by thermal or by microwave reactors. The conditions within the reactor can be optimized to produce high capacity, carbon/lithium intercalated particles (e.g., with specific capacity >350 mAh/g @200 cycles). Some examples of the properties of the innate, as-deposited carbon meta particles that can be tuned by changing reactor processing conditions include (1) morphology, (2) basal-to-edge plane ratio, (3) structure (e.g., crystallinity), (4) chemical purity, and (5) electrochemical performance (e.g., evaluated using lithium intercalation in "2032" half cells between 0 1.5 V and at rates up to 0.5 C). In some embodiments, reactor conditions are tuned to create carbon meta particles with improved specific capacity, porosity, surface area, structure/crystallinity, purity/surface functionalization, and stability of SEIs, as compared to conventional battery materials.

Lithium loading/intercalation into the carbon meta particles can also be optimized for stability and reversibility (i.e., to serve as a potential source of lithium ions for a full cell configuration).

In addition to innate carbon meta particle development, polymeric artificial SEIs can be incorporated into the electrode materials for increased stability and performance. For example, a stabilized (e.g., cyclized, or carbonized) polyacrylonitrile (PAN) conductive binder, which exhibits both intrinsic electrical conductivity along with polymeric elasticity, can be infiltrated into the porous meta carbon structure to form an 'in-situ' solid electrolyte surface layer. In some embodiments, an acrylonitrile (AN) monomer precursor solution is also used to enhance infiltration prior to polymerization and stabilization of the PAN. These artificial solid electrolyte surface layers can either be deposited in situ in the reactor during the carbon meta particle formation (e.g., in a multi-chamber reactor system in a chamber downstream from the chamber wherein the carbon meta particles are first formed, and before the particles leave the multi-chamber reactor), or in post-processes after the carbon meta particles are formed.

Some examples of techniques that can be used to characterize the current carbon meta materials (i.e., particles or deposited films) are Brunauer-Emmett-Teller (BET) measurements for surface area, scanning electron microscopy (SEM) for morphology, Raman spectroscopy for structure/crystallinity, and scanning tunneling electron microscopy with energy dispersive x-ray spectroscopy (STEM/EDX) for elemental mapping of active components/impurities. In some embodiments, the carbon meta particles, with and without incorporated active components, have improved surface area, morphology, dispersion of incorporated active components, and/or impurity concentrations, compared to conventional battery materials. Carbon meta particles can also be slurry cast onto copper foils to form electrode layers containing the particles, and these electrodes can be tested in a "2032" coin cell (and pouch cell) configuration with lithium foil counter electrodes to evaluate the electrode properties. For example, charge-discharge (galvanostatic and potentiostatic), cyclic voltammetry and AC impedance can be used to measure specific capacity, coulombic efficiency, redox reaction mechanisms, diffusion, and DC resistance. In some embodiments, electrodes incorporating the carbon meta particles, with or without incorporated active components, have improved specific capacity, coulombic efficiency, redox reaction mechanisms, diffusion, and/or DC resistance, compared to conventional battery materials.

In some embodiments, the carbon meta particles described above include active (anodic) silicon. For example, the meta carbon particles can contain discrete silicon nanoparticles or 'in-situ' formed nanostructured phases of silicon. In some cases, the carbon meta particles with active silicon can also contain one or more polymer binders for SEI control. In some cases, the carbon meta particles with active silicon have specific capacity of 1000 mAh/g @200 cycles. Both elemental silicon and silicon oxides can be incorporated into carbon meta particles for a battery electrode. Both elemental silicon and silicon oxides have specific capacities (e.g., 4200 mAh/g and 1600 mAh/g, respectively) greater than carbon/graphite. One challenge of incorporating silicon in situ, during the carbon meta particle formation (e.g., by introducing discrete nanoparticles or vapor or liquid precursors into the reactor during particle formation), is controlling the formation of insulating phases, such as SiC, at the interface between silicon and carbon. The reactor conditions can be tuned to prevent the formation of insulating layers during in situ active materials incorporation into the carbon meta particles. For example, the oxidizing/reducing environment of the reactor (e.g., in a microwave reactor) can be controlled (e.g., by creating a mild oxidizing condition with the addition of $CO_2$), to prevent SiC formation. Additionally, the oxidizing/reducing environment of the reactor can also functionalize the carbon surface (e.g., with oxygen, sulfur, or other species) to affect surface tension (i.e., wettability and reactivity) for subsequent post processing/treatment steps. In some embodiments, the carbon meta particles described herein are produced using microwave plasma reactors and methods, such as any appropriate microwave reactor and/or method described in U.S. Pat. No. 9,812,295, entitled "Microwave Chemical Processing," or in U.S. Pat. No. 9,767,992, entitled "Microwave Chemical Processing Reactor," which are assigned to the same assignee as the present application, and are incorporated herein by reference as if fully set forth herein for all purposes.

In some embodiments, the silicon nanoparticles are incorporated into or dispersed with the carbon meta particles in one or more post-reactor processes, instead of directly incorporating active materials (e.g., in the form of discrete nanoparticles or via vapor or liquid transport) during carbon meta particle formation in the reactor (e.g., microwave reactor). One example of a post-reactor process is plasma milling. The properties of these particles and of electrode layers containing these particles (e.g., carbon-to-silicon ratio and distribution, other materials properties, and electrical properties within coin cells) can be evaluated as described above, and these post-reactor processed particles can also have improved properties compared to conventional battery materials.

In some embodiments, cathodic electroactive materials (e.g., elemental sulfur or lithium sulfide) are incorporated into the carbon meta particles described above. Various methods can be used to incorporate cathodic electroactive materials into the structure of the carbon meta particles. For example, the cathodic electroactive materials can be incorporated directly during carbon meta particle formation within the reactor (e.g., by introducing discrete nanoparticles or vapor or liquid precursors into the reactor during particle formation), or by post-reactor processes (e.g., via vapor phase absorption with a reactant such as phenyl sulfide). In some embodiments, properly optimized within the reactor, the carbon mesoporous, meta particle framework will constrain cathodic electroactive materials (e.g., elemental sulfur) growth to within the channels and provide essential electrical contact to the insulating cathodic electroactive materials. In addition, cathodic electroactive materials solubility and crystallinity in relation to lithium phase formation, can be confined/trapped within the microporous/mesoporous framework.

In some embodiments, the carbon meta particles contain cathodic electroactive sulfur. The properties of these carbon meta particles containing sulfur and of electrode layers containing these particles (e.g., carbon-to-sulfur ratio and distribution, other materials properties, and electrical properties within coin cells) can be evaluated as described above, and these carbon-sulfur meta particles can also have improved properties compared to conventional battery materials.

In addition to innate carbon meta particles containing sulfur, similar techniques as those described above can be used to create a polymeric artificial SEI for increased stability and performance. For example, PAN conductive binder, as well as other candidate polymers, can be infiltrated into the porous carbon structure to form an 'in-situ' solid electrolyte surface layer and further confine the sulfur redox reaction to within the meso porous carbon framework. In some embodiments, electrodes containing carbon-sulfur meta particles have specific capacity of >600 mAh/g @ 500 cycles.

In some embodiments, carbon meta particles are pre-lithiated (i.e., lithium is incorporated during particle formation) and then the particles are post-reactor processed with elemental sulfur to form $Li_2S$ within the confined channels of the mesoporous structure. Some of the post-reactor processes described in the anode formation above can also be used to form $Li_2S$ within the meta carbon particles for cathodes. The properties of these carbon meta particles containing $Li_2S$ and of electrode layers containing these particles (e.g., carbon-to-sulfur ratio and distribution, other materials properties, and electrical properties within coin cells) can be evaluated as described above, and these carbon-sulfur meta particles containing $Li_2S$ can also have improved properties compared to conventional battery materials.

Full lithium ion batteries can be formed from the current anodes and/or cathodes described above, in accordance with some embodiments.

In some embodiments, the current anodes and/or cathodes described above are formed into a full cell (battery) using conventional counter electrodes (if only one current electrode is used) and/or using conventional or modified electrolytes.

In some embodiments, a lithium ion battery contains the current anodes and/or cathodes described above, and a conventional electrolyte containing a 1-1.2 M $LiPF_6$ salt in 1:1 weight ratio of ethylene carbonate and diethyl carbonate (EC/DEC). In other embodiments, other similar conventional lithium ion electrolytes are used. However, in other embodiments, lithium ion batteries contain the current anodes and/or cathodes described above, and a modified electrolyte. For example, the electrolyte can be modified to improve the efficiency of sulfur confinement within the mesoporous structure and the stability of the SEI at the anode. The effects of the electrolyte modifications can be evaluated in half cell configurations for stability prior to conducting full cell tests.

In some embodiments, a lithium ion battery contains the current anodes and/or cathodes described above and is a full C—Si—S cell. In some embodiments, the thicknesses of the current electrodes described above are optimized to create a matched cell with full lithium utilization. In some embodiments, pre-conditioning charge/discharge protocols are used to test the full cells. For example, a high first cycle charge rate can result in a porous, resistive SEI layer with minimal solvent absorption, whereas lower rates promote a denser SEI layer. In some embodiments, a pre-conditioning protocol is used to maximize the initial capacity and insure long term stability. In some embodiments, a lithium ion battery (full cell) containing the current anode and/or cathodes described above has a specific capacity >1200 mAh/g @ 1000 cycles.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A lithium (Li) ion battery, comprising:
a cathode formed of few layer graphene (FLG) sheets defining a three-dimensional (3D) carbon-based multi-modal structure comprising:
a plurality of interconnected channels configured to provide ion transport;
a plurality of functional pores configured to retain elemental sulfur or assist with polysulfide microconfinement; and
a plurality of aggregates formed from two or more FLG sheets sintered together and configured to provide electric conduction between contact points of the two or more FLG sheets; and
an electroactive material including any one or more of elemental sulfur or lithium sulfide ($Li_2S$) infiltrated into any one or more of the plurality of functional pores or the plurality of interconnected channels of the 3D carbon-based multi-modal structure.

2. The Li ion battery of claim 1, further comprising:
a first substrate, wherein the cathode is disposed on the first substrate.

3. The Li ion battery of claim 1, wherein the polysulfide includes $Li_xS_y$, wherein x is from 0 to 2 and y is from 1 to 8.

4. The Li ion battery of claim 2, further comprising:
a second substrate positioned opposite to the first substrate, wherein the first or the second substrate includes any one or more of metal foil, carbon foam, metal foam, carbon paper, carbon fibers, carbon nanofibers, carbon cloth, or particulate carbon.

5. The Li ion battery of claim 4, further comprising:
an anode disposed on the second substrate, wherein the anode includes the three-dimensional (3D) carbon-based multi-modal structure.

6. The Li ion battery of claim 5, wherein the anode further comprises silicon-containing materials including any one or more of an elemental silicon or a lithium and silicon containing material.

7. The Li ion battery of claim 1, wherein the FLG sheets comprise up to 15 layers of graphene.

8. The Li ion battery of claim 1, wherein at least one of the aggregates comprises more than 99% carbon.

9. The Li ion battery of claim 1, wherein a median dimension of each of the aggregates ranges between approximately 0.1 microns and approximately 50 microns.

10. The Li ion battery of claim 1, wherein a median surface area of each of the aggregates is between approximately 10 $m^2/g$ and approximately 300 $m^2/g$ when measured via a Brunauer-Emmett-Teller (BET) method using nitrogen as an adsorbate.

11. The Li ion battery of claim 1, wherein at least one of the aggregates has an electrical conductivity between approximately 500 S/m and approximately 20,000 S/m.

12. The Li ion battery of claim 1, wherein the cathode further comprises a binder.

13. A lithium (Li) ion battery, comprising:
an anode formed of few layer graphene (FLG) sheets defining a three-dimensional (3D) carbon-based bi-modal structure comprising:
a plurality of interconnected channels configured to provide ion transport; and
a plurality of aggregates formed from two or more FLG sheets sintered together and configured to provide electric conduction between contact points of the two or more FLG sheets; and
an electroactive material including a silicon (Si) containing material configured to form a lithium-silicon (Li—Si) compound upon exposure to Li.

14. The Li ion battery of claim 13, wherein the anode further comprises any one or more of graphene oxide (GO), a polymeric material, or a binder.

15. A method of producing a lithium (Li) battery electrode, the method comprising:
forming aggregates of graphene sheets from a carbon-containing vapor flow stream independent of a seed particle;
defining an interconnected network of three-dimensional (3D) hierarchical mesoporous structures based on the aggregates, the interconnected network configured to retain one or more electroactive electrode materials; and
depositing the aggregates onto an electrically conductive current collector.

16. The method of claim 15, further comprising:
infiltrating lithium-containing material into the aggregates, the lithium-containing material configured to provide electric conduction throughout the interconnected network.

17. The method of claim 16, further comprising:
intercalating Li obtained from the lithium-containing material between the graphene sheets within any one or more of the aggregates.

18. The method of claim 15, further comprising:
incorporating polymeric artificial solid-electrolyte interfaces (SEIs) into the aggregates.

19. The method of claim 18, wherein the SEIs include any one or more of a cyclized polyacrylonitrile conductive binder, a carbonized polyacrylonitrile conductive binder or an acrylonitrile monomer precursor solution.

20. The method of claim 15, further comprising:
slurry casting the aggregates of graphene sheets onto a copper foil.

* * * * *